(12) United States Patent
Itow et al.

(10) Patent No.: US 6,959,241 B2
(45) Date of Patent: Oct. 25, 2005

(54) ENGINE CONTROL DEVICE

(75) Inventors: Koichiro Itow, Shibuya (JP); Hikosaburou Hiraki, Oyama (JP); Jun Morinaga, Yokohama (JP)

(73) Assignee: Komatsu Ltd., Tokyo (JP)

( * ) Notice: Subject to any disclaimer, the term of this patent is extended or adjusted under 35 U.S.C. 154(b) by 39 days.

(21) Appl. No.: 10/694,018

(22) Filed: Oct. 28, 2003

(65) Prior Publication Data

US 2004/0088103 A1    May 6, 2004

(30) Foreign Application Priority Data

Oct. 29, 2002  (JP) .............................. 2002-314499

(51) Int. Cl.$^7$ .............................................. G06G 7/70
(52) U.S. Cl. ...................... 701/102; 701/111; 123/361; 123/481; 123/493
(58) Field of Search ............... 701/102, 111; 123/481, 123/493, 361, 339

(56) References Cited

U.S. PATENT DOCUMENTS

| | | | | |
|---|---|---|---|---|
| 5,469,646 A | * | 11/1995 | Takamura | .................... 60/428 |
| 5,752,214 A | * | 5/1998 | Minowa et al. | ............. 701/111 |
| 6,148,257 A | * | 11/2000 | Katakura et al. | ............. 701/54 |
| 6,564,172 B1 | * | 5/2003 | Till | ............................ 702/182 |

FOREIGN PATENT DOCUMENTS

JP          3064574          5/2000

* cited by examiner

*Primary Examiner*—Tony M. Argenbright
*Assistant Examiner*—Johnny H. Hoang
(74) *Attorney, Agent, or Firm*—Wenderoth, Lind & Ponack, L.L.P.

(57) ABSTRACT

An engine control device capable of improving engine efficiency by operating the engine in an area where fuel consumption is small (good) while allowing high responsivity of the engine to be maintained. The object can be achieved by operating to match at a point on a target torque line of a torque diagram and operating an electric motor when a matching point moves on the target torque line in a direction in which a load applied to the engine output shaft becomes large.

26 Claims, 21 Drawing Sheets

ENGINE CONTROL DEVICE

BACKGROUND OF THE INVENTION

1. Field of the Invention

The present invention relates to an engine control device, and more particularly to an engine control device which is used when hydraulic equipment such as a hydraulic pump is driven by an engine.

2. Description of the Related Art

Construction machines such as hydraulic excavators, bulldozers, dump trucks and wheel loaders have a diesel engine mounted thereon.

The structure of a conventional construction machine 1 will be described briefly with reference to FIG. 1. As shown in FIG. 1, a hydraulic pump 6 is driven by a diesel engine 2 used as a drive source. For the hydraulic pump 6, a variable displacement hydraulic pump is used, and its displacement D (cc/rev) is varied by varying the inclination angle of its swash plate 6a, or the like. Pressure oil discharged with a discharge pressure P and a flow rate Q (cc/min) from the hydraulic pump 6 is supplied to individual hydraulic actuators 31 to 35, e.g., a boom hydraulic cylinder 31, via operation valves 21 to 25. The supply of the pressure oil to the hydraulic actuators 31 to 35 drives these hydraulic actuators 31 to 35, and a working machine comprising a boom, an arm and a bucket and a lower traveling body which are connected to the hydraulic actuators 31 to 35 operate accordingly.

While the construction machine 1 is operating, a load applied to the working machine and the lower traveling body is constantly variable depending on the quality of excavated soil, the inclination of a running road or the like. Accordingly, the load of the hydraulic equipment (hydraulic pump 6) (hereinafter called as the hydraulic equipment load), namely the load applied to the engine 2, is changed.

The power (horsepower; kw) of the diesel engine 2 is controlled by adjusting an amount of fuel injected into the cylinders. This adjustment is made by controlling a governor 3 attached to a fuel injection pump of the engine 2. For the governor 3, an all-speed governor is generally used and adjusts an engine speed N and a fuel injection amount (torque T) according to the load to keep a target engine speed set by a fuel dial. In other words, the governor 3 adjusts the fuel injection amount to eliminate a difference between the target engine speed and the engine speed.

FIG. 14 shows a torque diagram of the engine 2, in which the horizontal axis represents an engine speed N (rpm; rev/min), and the vertical axis represents torque T (N·m).

The area specified by a maximum torque line R2 in FIG. 14 indicates the performance delivered by the engine 2. The governor 3 controls the engine 2 in such a manner that the torque T does not exceed the maximum torque line R2 to have an exhaust smoke limit or the engine speed N does not exceed a high idle rotational speed NH to have an over speed. The power (horsepower) of the engine 2 becomes maximum at a rated point V2 on the maximum torque line R2. "J" indicates an equal horsepower curve showing that the horsepower absorbed by the hydraulic pump 6 becomes equal horsepower.

When the maximum target rotational speed is set by the fuel dial, the governor 3 adjusts the speed on a maximum speed regulation line Fe which connects the rated point V2 and the high idle point NH.

A matching point, at which the power of the engine 2 and pump absorption horsepower are balanced as hydraulic equipment load increases, moves toward the rated point V2 along the maximum speed regulation line Fe. When the matching point moves toward the rated point V2, the engine speed N is decreased gradually, and the engine speed N becomes a rated rotational speed NR at the rated point V2.

Regulation lines Fe-1, Fe-2 . . . are sequentially determined as the target rotational speed set by the fuel dial becomes small, and the speed is adjusted on the individual regulation lines.

The engine 2 of the construction machine 1 is required to have adequate responsivity when the hydraulic equipment load becomes high. In other words, the engine has higher responsivity as a time, in which the matching point moves from the no load high idle point NH to the maximum load rated point V2 along the regulation line Fe, is shorter.

In this connection, a conventional engine control method gradually decreases the engine speed N when the matching point moves toward high load side along the regulation line Fe as described above. When the engine speed N lowers, the power accumulated in the flywheel of the engine 2 is momentarily released to the outside, and the appearance power of the engine 2 becomes larger than the real power. Therefore, the conventional engine control method is said to have good responsivity.

As described above, according to the conventional engine control method, the engine 2 can be made to follow the hydraulic equipment load with good responsivity but has disadvantages that a fuel consumption rate is large (bad) and pump efficiency is low. The fuel consumption rate (hereinafter called as the fuel consumption) is an amount of fuel consumption for power of 1 kW in one hour and an index for the efficiency of the engine 2. And, the pump efficiency is the efficiency of the hydraulic pump 6 which is specified by capacity efficiency and torque efficiency.

In FIG. 14, "M" indicates an equal fuel consumption curve. The fuel consumption becomes minimum at M1 forming a valley of the equal fuel consumption line M and becomes large from the fuel consumption minimum point M1 toward the outside.

It is apparent from FIG. 14 that the regulation line Fe is equivalent to an area where the fuel consumption is relatively large on the equal fuel consumption curve M. Therefore, the conventional engine control method had a disadvantage that the fuel consumption was large (bad) and not desirable in view of the engine efficiency.

Meanwhile, the variable displacement hydraulic pump 6 is generally known that, when the discharge pressure P is same, the capacity efficiency and the torque efficiency become high as the pump displacement D (swash plate inclination angle) is large, and the pump efficiency is high.

It is also apparent from the expression (1) below that, when the flow rate Q of the pressure oil discharged from the hydraulic pump 6 is same, the pump displacement D can be increased when the rotational speed N of the engine 2 is lowered. Therefore, the pump efficiency can be increased when the engine 2 is lowered its speed.

$$Q = N \cdot D \quad (1)$$

Therefore, the engine 2 is advisably operated in a low-speed area, where the rotational speed N is low, to enhance the pump efficiency of the hydraulic pump 6.

It is apparent from FIG. 14, however, that the regulation line Fe is equivalent to a high-speed area of the engine 2. Therefore, the conventional engine control method has a disadvantage that the pump efficiency is low.

SUMMARY OF THE INVENTION

The present invention has been made in view of the above circumstances and has a first advantage of operating the engine 2 in a small (good) fuel consumption area in order to enhance the engine efficiency.

The present invention has a second advantage of maintaining high responsivity of the engine 2 while achieving the first advantage.

The present invention has a third advantage of enhancing the efficiency of the hydraulic pump 6 by operating the engine 2 in an area having high pump efficiency.

The present invention has a fourth advantage of making it possible to maintain high responsivity of the engine 2 while achieving the third advantage.

A first aspect of the invention is to achieve the first advantage and relates to an engine control device for controlling an engine to move a matching point according to a load applied to the engine on an engine torque diagram having an axis representing an engine speed and an axis representing torque, wherein:

a target torque line is set to pass through a fuel consumption minimum point, where a fuel consumption rate becomes minimum, or to pass through a vicinity of the fuel consumption minimum point on the engine torque diagram, and the engine is controlled to match at a point on the target torque line.

According to the first aspect of the invention, a target torque line L1 is set at the fuel consumption minimum point M1, where the fuel consumption rate becomes minimum, on the equal fuel consumption curve M of the torque diagram, or on an area which is in the vicinity of the fuel consumption minimum point M1 and where the fuel consumption becomes relatively low, as shown in FIG. 4, and the engine 2 is controlled to match a point on the target torque line L1.

According to the first aspect of the invention, the engine 2 operates in an area where the fuel consumption is low (good), so that the engine efficiency can be enhanced.

The engine 2 is controlled as shown in, for example, FIG. 3. Specifically, the target torque line L1 is set, and a correspondence G between a load (power) LD applied to the engine 2 and a target rotational speed ND of the engine 2 is stored according to the target torque line L1. The load LD applied to the engine 2 is calculated, and the target rotational speed ND corresponding to the calculated load LD is determined from the above stored correspondence G. And, the engine 2 is controlled so that the determined target rotational speed ND can be obtained.

A second aspect of the invention is to achieve the first advantage and relates to an engine control device for controlling an engine to move a matching point according to a load applied to the engine on an engine torque diagram having an axis representing an engine speed and an axis representing torque, wherein:

a target torque line is set to pass through a fuel consumption minimum point, where a fuel consumption rate becomes minimum on individual equal horsepower curves of the engine torque diagram, or to pass through a vicinity of the fuel consumption minimum point, and the engine is controlled to match at a point on the target torque line.

According to the second aspect of the invention, a target torque line L11 which passes through fuel consumption minimum points V1, V12, V13 . . . , where the fuel consumption rate becomes minimum, on individual equal horsepower curves J1, J2, J3 . . . of the torque diagram or the vicinity of the fuel consumption minimum points V1, V12, V13 . . . are determined as shown in FIG. 17, and the engine 2 is controlled so to match the points on the target torque line L11. According to the second aspect of the invention, when the matching point moves on the target torque line L11 according to a change in load of the engine 2, the engine 2 can always be operated with the minimum fuel consumption or substantially minimum fuel consumption. Thus, the engine efficiency can be enhanced.

A third aspect of the invention relates to the first aspect of the invention or the second aspect of the invention, wherein the engine is controlled to match at a point on the target torque line including a line segment which connects a torque point at a time of rated output and the fuel consumption minimum point or the vicinity of the fuel consumption minimum point.

According to the third aspect of the invention, target torque lines L1, L2, L3, L4, L11 including a line segment which connects the torque point V1 at a time of the rated power and the fuel consumption minimum point M1 or the vicinity of the fuel consumption minimum point M1 are determined, and the engine 2 matches at points on the target torque lines L1, L2, L3, L4, L11 as shown in FIG. 5, FIG. 6, FIG. 7, FIG. 8 and FIG. 17.

A fourth aspect of the invention relates to the first aspect of the invention, the second aspect of the invention or the third aspect of the invention, wherein the engine is controlled to match at a point on the target torque line which connects a torque point at a time of rated output, the fuel consumption minimum point or the vicinity of the fuel consumption minimum point and a deceleration point at a time of auto deceleration or a vicinity of the deceleration point.

According to the fourth aspect of the invention, a target torque line L1 which connects a torque point V1 at the rated power, the fuel consumption minimum point M1 or the vicinity of the fuel consumption minimum point M1 and a deceleration point N1 at auto deceleration or the vicinity of the deceleration point N1 is determined as shown in FIG. 4, and the engine 2 matches at points on the target torque line L1.

It is necessary to increase the engine speed N to move the matching point on the target torque line L1 from a no load state to a high load side, namely the rated point V1 side.

Here, if the no load rotational speed is set to a very low speed, it takes a long time to accelerate the flywheel of the engine 2 from a very low rotation to a rated rotational speed NR of a high rotation, and the responsivity of the engine 2 lowers. Conversely, when the no-load rotational speed is set to a high level, a time to reach the rated rotational speed NR can be decreased, and the responsivity of the engine 2 is improved. But, when the no-load rotational speed is set to a high-speed side, the engine 2 operates in an area where the fuel consumption is large (poor) in the same way as the prior art (FIG. 14).

According to the fourth aspect of the invention, the no-load rotational speed is set to the deceleration rotational speed N1 of a medium speed considering the above-described trade off. The deceleration rotational speed N1 (e.g., 1400 rpm) is a no-load rotational speed assuring that, when an operation lever 41a for the working machine (see FIG. 2) is moved from the neutral position to apply a hydraulic equipment load, it takes only a short time (e.g., about one second) to reach from a no-load state to the rated rotational speed NR.

Therefore, when the deceleration rotational speed N1 is set to an engine speed under no load, it takes only a short time to move the matching point from this deceleration point N1 to the high-load rated point V1, and the fuel consumption is improved, and the responsivity of the engine 2 can be prevented from degrading.

A fifth aspect of the invention is to achieve the first advantage and relates to an engine control device for controlling an engine by a governor to move a matching point according to a load applied to the engine on an engine torque diagram having an axis representing an engine speed and an axis representing torque, wherein:

a target torque line is set to pass through a fuel consumption minimum point, where a fuel consumption rate becomes minimum on the engine torque diagram or to pass through a vicinity of the fuel consumption minimum point;

individual regulation lines are set to connect individual matching target rotational speeds and individual instructed rotational speeds on the target torque line;

the governor injects fuel in an amount corresponding to a difference between an instructed rotational speed and a real rotational speed into the engine; and a command to change the instructed rotational speed by a portion corresponding to a difference between a matching target rotational speed and the real rotational speed is given to the governor.

According to the fifth aspect of the invention, the target torque line L1 is set at the fuel consumption minimum point M1, where the fuel consumption rate becomes minimum, on the equal fuel consumption curve M of the torque diagram or an area which is in the vicinity of the fuel consumption minimum point M1 and where the fuel consumption becomes relatively small in the same way as the first aspect of the invention as shown in FIG. 4.

A controller 7 and the governor 3 control the engine 2 as described below so to match a point on the target torque line L1.

Specifically, regulation lines F0, F1, ... Fn ... Fe (maximum speed regulation lines), which connect individual matching target rotational speeds N0t, N1t, ... N1t ... NR (rated points) on a target torque line L1 and individual instructed rotational speeds N0d, N1d, ... Nnd ... Ned, are determined as shown in FIG. 19.

As shown in FIG. 20, the governor 3 injects an injection amount α(Nnd−Nnr) of fuel corresponding to a difference between the instructed rotational speed Nnd and the real rotational speed Nnr into the engine 2.

And the controller 7 gives the governor 3 a command to change the instructed rotational speed Nnd to Nnd' according to the difference Nnt−Nnr between the matching target rotational speed Nnt and the real rotational speed Nnr.

Thus, the regulation line moves from Fn to a regulation line Fn' which on the same equal horsepower curve J as the present rotational speed Nnr and passes across the target torque line L1 and matches at a matching point Nnt' (matching target rotational speed Nnt') on the regulation line Fn'. Thus, the matching point moves from the point Nnt on the target torque line L1 to the point Nnt' where the horsepower is lower.

The case in which the load applied to the engine 2 became small was described above, but when the load applied to the engine 2 becomes large, the matching point moves in the same way along the target torque line L1 as the load changes.

As described above, the matching point can be moved sequentially along the target torque line L1 according to a change in load of the engine 2.

A sixth aspect of the invention is to achieve the first advantage and relates to an engine control device for controlling an engine by a governor to move a matching point according to a load applied to the engine on an engine torque diagram having an axis representing an engine speed and an axis representing torque, wherein:

a target torque line is set to pass through a fuel consumption minimum point, where a fuel consumption rate becomes minimum on individual equal horsepower curves of the engine torque diagram, or to pass through a vicinity of the fuel consumption minimum point;

individual regulation lines are set to connect individual matching target rotational speeds and individual instructed rotational speeds on the target torque line;

the governor injects fuel in an amount corresponding to a difference between an instructed rotational speed and a real rotational speed into the engine; and a command to change the instructed rotational speed by a portion corresponding to a difference between a matching target rotational speed and the real rotational speed is given to the governor.

According to the sixth aspect of the invention, the target torque line L11 passing through the fuel consumption minimum points V1, V12, V13 ..., where the fuel consumption rate becomes minimum on the individual equal horsepower curves J1, J2, J3 ... of the torque diagram, or the vicinity of the fuel consumption minimum points V1, V12, V13 ... is set in the same way as the second aspect of the invention as shown in FIG. 17. And, the engine 2 is controlled by the controller 7 and the governor 3 in the same way as the fifth aspect of the invention, and the matching point moves sequentially along the target torque line L11 with a change in load of the engine 2.

A seventh aspect of the invention is to achieve the second advantage and relates to the first aspect of the invention to the sixth aspect of the invention, wherein:

an electric motor is coupled to an output shaft of the engine; and the electric motor is operated when the matching point moves on the engine torque diagram in a direction that a load applied to the output shaft becomes large.

According to the seventh aspect of the invention, an electric motor 4 is coupled to an output shaft 5 of the engine 2 as shown in FIG. 1 and operates when the matching point moves in a direction that the load applied to the output shaft 5 increases on the torque diagram as indicated by an arrow in FIG. 4.

When the hydraulic equipment load increases and the matching point moves from the no-load deceleration point N1 to the high-load rated point V1, the power of the electric motor 4 is added to the power of the engine 2. The time to accelerate the flywheel of the engine 2 is reduced as the engine power is assisted by the power of the electric motor 4, and the matching point can be moved to the rated point V1 in a short time. Therefore, the fuel consumption is improved, and the responsivity of the engine 2 can be kept high by the seventh aspect of the invention.

An eighth aspect of the invention is to achieve the second advantage and relates to the fifth aspect of the invention or the sixth aspect of the invention, wherein:

an electric motor is coupled to an output shaft of the engine;

an upper limit line specifying a maximum injection amount of fuel is set between an engine maximum torque line and the target torque line on the engine torque diagram; and the electric motor is operated when an injection amount corresponding to a difference between an instructed rotational speed and a real rotational speed exceeds the maximum injection amount specified by the upper limit line.

According to the eighth aspect of the invention, the electric motor 4 is coupled to the output shaft 5 of the engine 2 as shown in FIG. 1.

And, an upper limit line U specifying the maximum injection amount of fuel is set between a maximum torque line R1 of the engine and the target torque line L1 on the torque diagram as shown in FIG. 19.

Individual upper limit rotational speeds N0m, N1m, . . . Nnm . . . Nem on the upper limit line U are determined in correspondence with the individual instructed rotational speeds N0d, N1d, . . . Nnd . . . Ned.

As shown in FIG. 21, when the load of the engine 2 is increased sharply and the engine 2 is accelerated, the difference Nnd–Nnr between the instructed rotational speed Nnd and the real rotational speed Nnr becomes large. Here, it is assumed that a large injection amount α(Nnd–Nnr) of fuel corresponding to the difference between the instructed rotational speed Nnd and the real rotational speed Nnr is injected from the governor 3 into the engine 2 in order to meet the required acceleration. Then, an amount of air to the fuel is relatively insufficient, the combustion efficiency of the engine 2 is degraded, and black smoke is exhausted.

Accordingly, when the injection amount α(Nnd–Nnr) corresponding to the difference Nnd–Nnr between the instructed rotational speed Nnd and the real rotational speed Nnr exceeds the maximum injection amount α(Nnd–Nnm) specified by the upper limit line U, the governor 3 injects the limited maximum injection amount α(Nnd–Nnm) of fuel into the engine 2, and the controller 7 operates the electric motor 4 to assist the remaining torque portion (α(Nnd–Nnr) –α(Nnd–Nnm)=α(Nnm–Nnr)) by the electric motor 4. Specifically, when the engine's real rotational speed Nnr becomes lower than the upper limit rotational speed Nnm as shown in FIG. 22, the controller 7 judges that the injection amount α(Nnd–Nnr) has exceeded the maximum injection amount α(Nnd–Nnm) which is specified by the upper limit line U and gives a positive torque command to an inverter 8 so that torque α(Nnm–Nnr) corresponding to the difference Nnm–Nnr between the upper limit rotational speed Nnm and the real rotational speed Nnr is produced by the electric motor 4.

According to the eighth aspect of the invention described above, the engine efficiency is improved while maintaining the acceleration and black smoke can be reduced because the power of the engine 2 is assisted by the electric motor 4 when a sudden load is applied.

A ninth aspect of the invention is to achieve the third advantage and relates to an engine control device for controlling an engine to move a matching point, where engine power torque matches absorption torque of a hydraulic pump, on an engine torque diagram having an axis representing an engine speed and an axis representing torque, wherein:

a target torque line is set in an area on the engine torque diagram where the engine has a low rotational speed and the hydraulic pump has a large displacement, and the engine is controlled to match at a point on the target torque line.

According to the ninth aspect of the invention, the target torque line L1 is set in the area where the rotational speed N of the engine 2 is lowered and the displacement D of the hydraulic pump 6 is increased as shown in FIG. 4, and the engine 2 is controlled so to match at a point on the target torque line L1.

According to the ninth aspect of the invention, the matching is made in the area where the rotational speed N of the engine 2 is lowered and the displacement D of the hydraulic pump 6 is increased, so that the engine 2 can be operated in the area where the pump efficiency is high, and the efficiency of the hydraulic pump 6 can be enhanced.

A tenth aspect of the invention is to achieve the third advantage and relates to an engine control device for controlling an engine to move a matching point, where engine power torque matches absorption torque of a hydraulic pump, on an engine torque diagram having an axis representing an engine speed and an axis representing torque, wherein:

a second target torque line, where the engine has a low rotational speed and the hydraulic pump has a large displacement, is set with respect to a first target torque line which passes through a fuel consumption minimum point, where a fuel consumption rate becomes minimum on individual equal horsepower curves of the engine torque diagram, or passes through a vicinity of the fuel consumption minimum point; and the engine is controlled to match at a point on the second target torque line.

According to the tenth aspect of the invention, a second target torque line L12 where the rotational speed N of engine 2 becomes low and the displacement D of the hydraulic pump 6 becomes large is set with respect to the first target torque line L11 passing through the fuel consumption minimum points V1, V12, V13 . . . where the fuel consumption rate becomes minimum on the individual equal horsepower curves J1, J2, J3 . . . of the torque diagram or the vicinity of the fuel consumption minimum points V1, V12, V13 . . . as shown in FIG. 18. And, the engine 2 is controlled so to match at a point on the target torque line L12.

When the matching is made at a point on the second target torque line L12, the fuel consumption becomes large as compared with the case that the matching is made at a point on the first target torque line L11, but the rotational speed becomes low, and the displacement D of the hydraulic pump 6 can be increased. Therefore, the efficiency of the hydraulic pump 6 is improved, and when the engine speed is same, larger engine horsepower can be obtained. As a result, the total efficiency of the engine 2 and the hydraulic pump 6 is improved, and the work can be performed efficiently by the higher engine power.

An eleventh aspect of the invention is to achieve the third advantage and relates to an engine control device for controlling an engine to move a matching point, where engine power torque matches absorption torque of a hydraulic pump, on an engine torque diagram having an axis representing an engine speed and an axis representing torque, wherein:

a first target torque line is set to pass through a fuel consumption minimum point, where a fuel consumption rate becomes minimum on individual equal horsepower curves of the engine torque diagram, or pass through a vicinity of the fuel consumption minimum point;

a second target torque line, where the engine has a low rotational speed and the hydraulic pump has a large displacement, is set with respect to the first target torque line;

either the first target torque line or the second target torque line is selected; and the engine is controlled to match at a point on the selected target torque line.

According to the eleventh aspect of the invention, the first target torque line L11 passing through the fuel consumption minimum points V1, V12, V13 . . . where the fuel consumption rate becomes minimum on the individual equal horsepower curves J1, J2, J3 . . . of the torque diagram or the vicinity of the fuel consumption minimum points V1, V12, V13 . . . is set as shown in FIG. 18, and the second target torque line L12 where the rotational speed N of the engine 2 becomes low and the displacement D of the hydraulic pump 6 becomes large is set with respect to the first target torque line L11. And, for example, either the first target torque line L11 or the second target torque line L12 is selected by one of selection switches 54, 55 for "power mode" and "economy mode" on a monitor panel 50 of FIG. 2. And, the engine 2 is controlled to make the matching at a point on the selected target torque line.

When the second target torque line L12 is selected and the matching is made at a point on the second target torque line L12, the fuel consumption becomes large but the rotational speed becomes low as compared with the case that the matching is made at a point on the first target torque line L11, and the displacement D of the hydraulic pump 6 can be increased. Therefore, the efficiency of the hydraulic pump 6 is improved, and when the engine speed is same, higher engine horsepower can be obtained. As a result, the total efficiency of the engine 2 and the hydraulic pump 6 is improved, and the work can be performed efficiently by higher engine power (power mode).

And, when the first target torque line L11 is selected and the matching is made at a point on the first target torque line L11, the engine power drops and the work efficiency lowers compared with the case that the matching is made at a point on the second target torque line L12, but the engine 2 can always be operated with the minimum or substantially minimum fuel consumption, and the engine efficiency can be enhanced (economy mode).

Therefore, according to the eleventh aspect of the invention, even if the work condition was changed, the engine 2 can always be operated in the optimum mode by selecting and can deal with a change in the work condition.

A twelfth aspect of the invention relates to the ninth aspect of the invention, the tenth aspect of the invention or the eleventh aspect of the invention, wherein means for controlling to have a prescribed differential pressure between a discharge pressure of the hydraulic pump and a load pressure of a hydraulic actuator is further disposed.

According to the twelfth aspect of the invention, a differential pressure ΔP between the discharge pressure P of the hydraulic pump 6 and a load pressure PLS of the hydraulic actuator 31 becomes a prescribed differential pressure ΔPLS by an LS valve 14 as shown in FIG. 2.

When it is assumed that the open area of the spool of the operation valve 21 is A and the resistance coefficient is C, the discharge flow rate Q of the hydraulic pump 6 is indicated by the expression (2).

$$Q = C \cdot A \cdot \sqrt{(\Delta P)} \qquad (2)\ \text{below}$$

The differential pressure ΔP is constant by virtue of the LS valve 14, so that the pump flow rate Q is variable depending on only the open area A of the spool of the operation valve 21.

When the working machine operation lever 41a is moved from the neutral position, the open area A of the spool of the operation valve 21 increases according to the operation amount, and the pump flow rate Q increases according to the increase of the open area A. At this time, the pump flow rate Q is not affected by a magnitude of the hydraulic equipment load but determined only by the operation amount of the working machine operation lever 41a. Thus, the pump flow rate Q is varied by the operator as he or she desires because the LS valve 14 is disposed, and the fine controllability is improved.

According to the expression (1) (Q=N·D) described above, the pump displacement D can be made larger as the rotational speed N of the engine 2 is lowered when the pump flow rate Q is same, and the pump efficiency can be enhanced.

Therefore, when the LS valve 14 is disposed, the pump displacement D can be increased as the rotational speed N of the engine 2 is lowered if the operation amount of the operation lever 41a is same, and the pump efficiency can be enhanced.

According to the present invention, the engine 2 operates in the area where the rotational speed N of the engine 2 is low, and the displacement D of the hydraulic pump 6 is large. By lowering the speed of the engine 2, the pump displacement D can always be kept at a high level and the pump efficiency can be kept high when the operation lever 41a is being operated. Thus, according to the twelfth aspect of the invention, the operating characteristics that the fine controllability is improved, and the pump efficiency can be kept high are realized because the LS valve 14 is disposed.

A thirteenth aspect of the invention is to achieve the fourth advantage and relates to the ninth aspect of the invention, the tenth aspect of the invention or the eleventh aspect of the invention, wherein:

an electric motor is coupled to an output shaft of the engine; and the electric motor is operated when a matching point moves on the engine torque diagram in a direction that a load applied to the output shaft becomes large.

According to the thirteenth aspect of the invention, the electric motor 4 is coupled to the output shaft 5 of the engine 2 as shown in FIG. 1, and the electric motor 4 operates when the matching point moves on the torque diagram in a direction that the load applied to the output shaft 5 becomes large as indicated by the arrow in FIG. 4.

When the hydraulic equipment load becomes large and the matching point moves from the no-load deceleration point N1 to the high-load rated point V1, the power of the electric motor 4 is added to the power of the engine 2. The time for accelerating the flywheel of the engine 2 becomes short as the engine power is assisted by the power of the electric motor 4, and the movement to the rated point V1 can be made in a short time.

Therefore, according to the thirteenth aspect of the invention, the responsivity of the engine 2 can be kept high while the pump efficiency is improved.

DETAILED DESCRIPTION OF THE PREFERRED EMBODIMENTS

Embodiments of the present invention will be described with reference to the accompanying drawings.

It is assumed in this embodiment that a diesel engine mounted on construction machines such as hydraulic excavators, bulldozers, dump trucks and wheel loaders is controlled.

Figure 1:
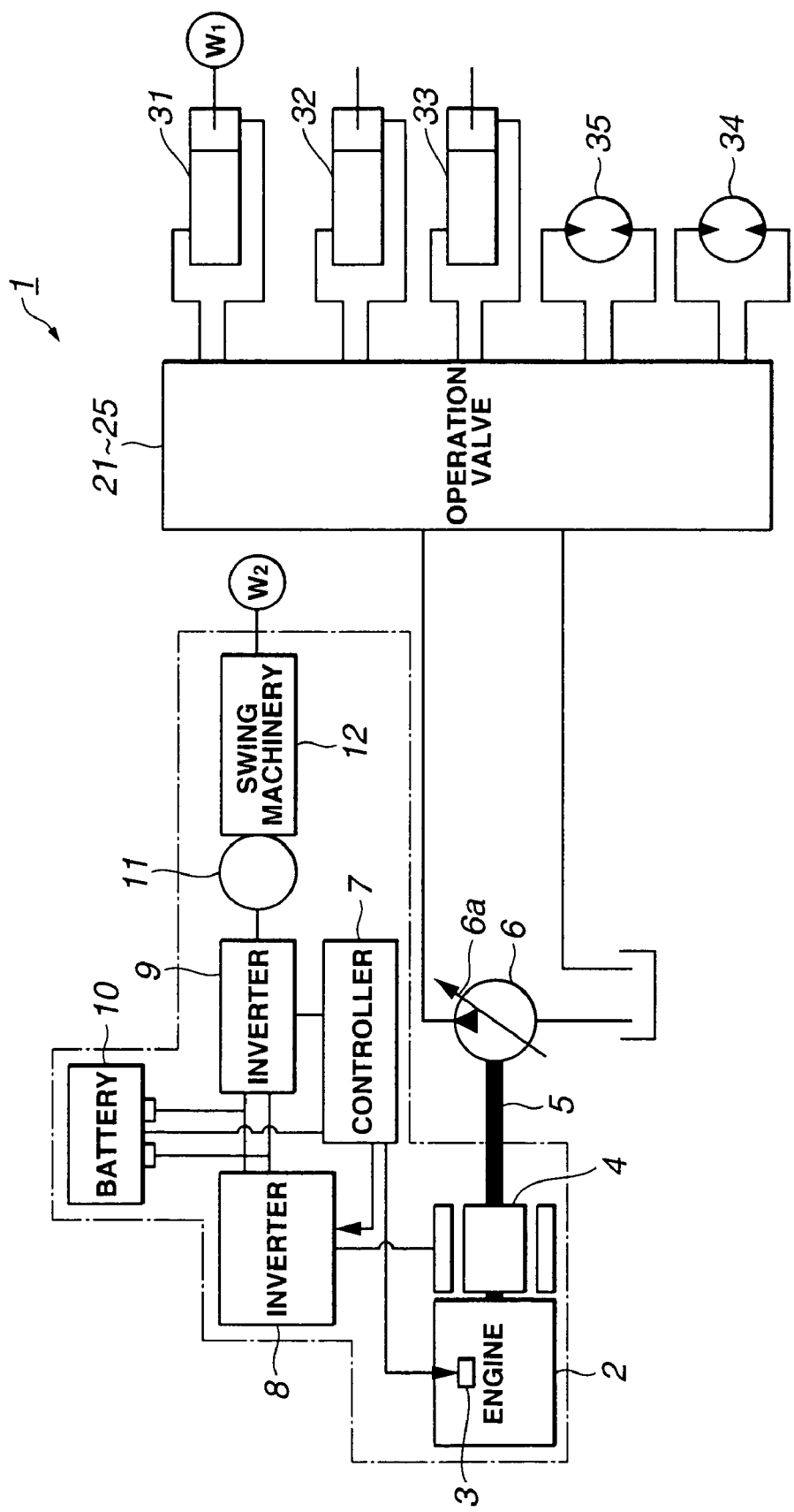
FIG. 1 is a diagram showing the configuration of an embodiment.
Figure 2:
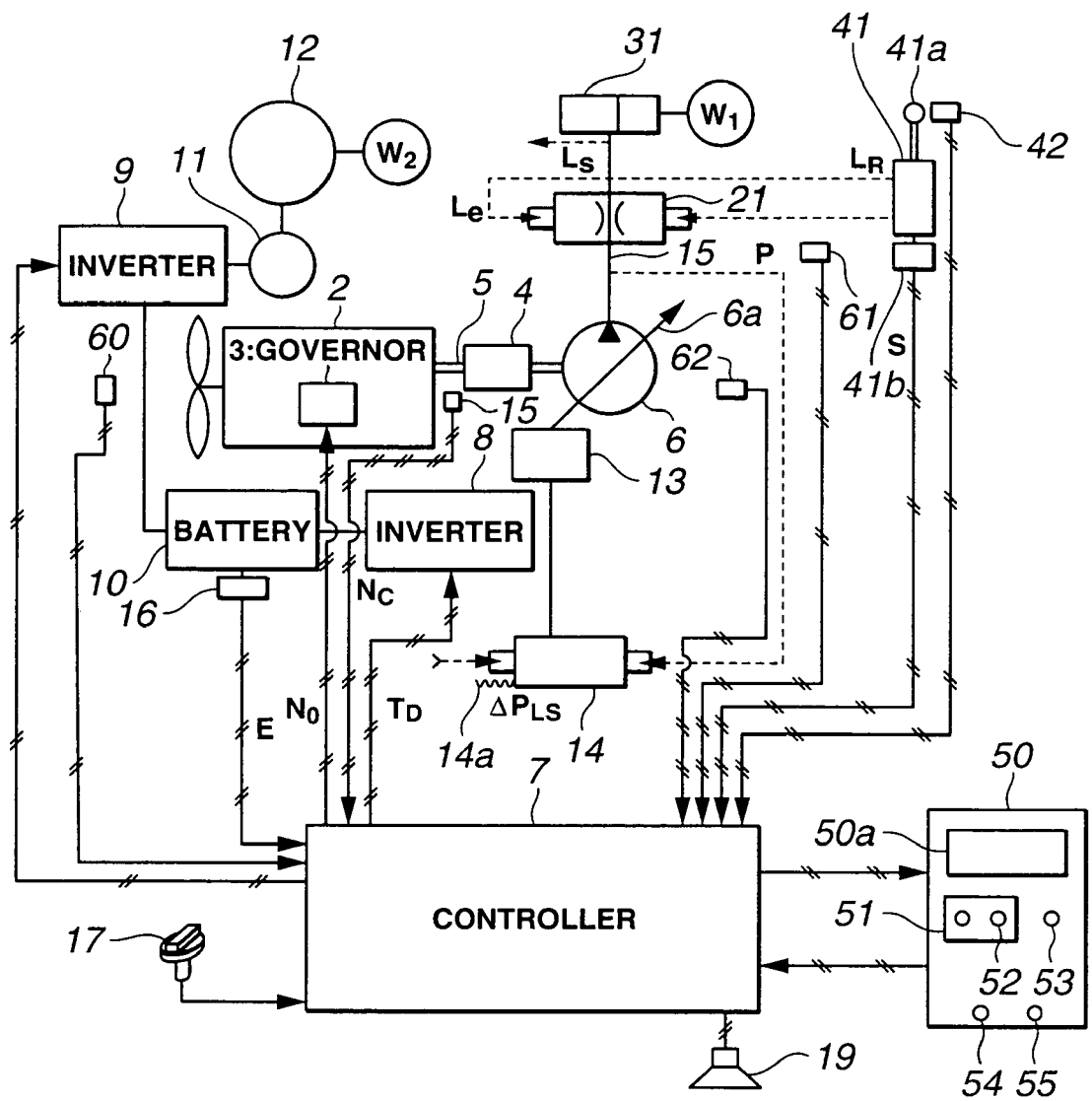
FIG. 2 is a diagram illustrating signals input to and output from the controller shown in FIG. 1.

FIG. 1 shows the whole structure of the construction machine 1 of the embodiment. The construction machine 1 is assumed to be a hydraulic excavator. FIG. 2 shows signals being input to and output from the controller 7 shown in FIG. 1.

The construction machine 1 is comprised of an upper rotating body W2 and a lower traveling body, and the lower traveling body is comprised of right and left caterpillar belts. A working machine comprising a boom, an arm and a bucket is attached to the vehicle body. The boom hydraulic cylinder 31 is driven to operate a boom W1, the arm hydraulic cylinder 32 is driven to operate the arm, and the bucket hydraulic cylinder 33 is driven to operate the bucket. The hydraulic motor 34 for left-side traveling and the hydraulic motor 35 for right-side traveling each are driven to rotate the left caterpillar belt and the right caterpillar belt.

When swing machinery 12 is driven, the upper rotating body W2 is rotated via a swing pinion, a swing circle, and the like.

The engine 2 is a diesel engine, and its power (horsepower; kw) is controlled by adjusting an amount of fuel injected into the cylinders. This adjustment is made by controlling the governor 3 attached to a fuel injection pump of the engine 2.

The controller 7 outputs to the governor 3 a rotation command value N0 to adjust the engine speed to a target rotational speed ND as described later, and the governor 3 adjusts an amount of injected fuel in such a way that the target rotational speed ND and engine power LD corresponding to the target rotational speed ND can be obtained on a target torque curve L1.

A generator motor 4 is coupled to the output shaft 5 of the engine 2. For example, the drive shaft of the generator motor 4 is coupled to the output shaft 5 via gears. The generator motor 4 performs a power-generating operation and an electric operation. In other words, the generator motor 4 operates as an electric motor (motor) as well as a generator. The generator motor 4 also functions as a starter for starting the engine 2. When a starter switch is turned on, the generator motor 4 performs the electric operation to rotate the output shaft 5 at a low rotational speed (e.g., 400 to 500 rpm), thereby starting the engine 2.

The generator motor 4 is controlled its torque by the inverter 8. The inverter 8 controls the torque of the generator motor 4 according to a torque command value TD output from the controller 7 as described later.

A generator motor 11 for turning is coupled to the drive shaft of the swing machinery 12.

The generator motor 11 for turning performs a power-generating operation and an electric operation. In other words, the generator motor 11 for turning operates as an electric motor (motor) as well as a generator. When the upper rotating body W2 stops, the torque of the upper rotating body W2 is absorbed to generate electricity.

The generator motor 11 for turning is controlled its torque by an inverter 9. The inverter 9 controls the torque of the generator motor 11 for turning according to a torque command value output from the controller 7

The inverters 8 and 9 each are electrically connected to a battery 10 via D.C. power lines. And, the inverters 8 and 9 are directly connected electrically to each other via D.C. power lines. The controller 7 operates with the battery 10 used as a power supply.

The battery 10 is comprised of a capacitor, a storage battery or the like and accumulates (charges) electric power generated by the generator motor 4 or the generator motor 11 for turning when it operates to generate electricity. The battery 10 supplies the electric power accumulated in it to the inverters 8 and 9. It is assumed in this specification that a capacitor which accumulates electric power as static electricity, a lead storage battery, a nickel metal hydride battery, a lithium-ion battery and other storage batteries (battery) are included as the battery 10.

The hydraulic pump 6 is connected to the output shaft 5 of the engine 2 and driven when the output shaft 5 rotates. The hydraulic pump 6 is a variable displacement hydraulic pump, and its displacement D (cc/rev) is varied by a change in inclination angle of the swash plate 6a.

Pressure oil discharged at a discharge pressure P and a flow rate Q (cc/min) from the hydraulic pump 6 is supplied to the boom operation valve 21, the arm operation valve 22, the bucket operation valve 23, the left-side running operation valve 24 and the right-side running operation valve 25.

The pressure oil output from the boom operation valve 21, the arm operation valve 22, the bucket operation valve 23, the left-side running operation valve 24 and the right-side running operation valve 25 is supplied to the boom hydraulic cylinder 31, the arm hydraulic cylinder 32, the bucket hydraulic cylinder 33, the left-side running hydraulic motor 34 and the right-side running hydraulic motor 35. Thus, the boom W1, the arm, the bucket, the left caterpillar belt and the right caterpillar belt are driven to operate by the boom hydraulic cylinder 31, the arm hydraulic cylinder 32, the bucket hydraulic cylinder 33, the left-side running hydraulic motor 34 and the right-side running hydraulic motor 35.

FIG. 2 typically shows the boom hydraulic cylinder 31 among the individual hydraulic actuators 31, 32, 33, 34, 35 and a connected state of the boom operation valve 21 and a boom operation lever device 41. The operation lever device 41 is provided with the operation lever 41a, and when the operation lever 41a is moved from its neutral position, a pilot pressure corresponding to its operation amount S is applied to a pilot port of the operation valve 21.

The operation valve 21 is a flow rate direction control valve to move the spool in a direction according to the operation direction of the operation lever 41a and to move the spool so to open an oil path by an open area A corresponding to the operation amount of the operation lever 41a.

A servo valve 13 operates according to a signal pressure output from the LS valve 14 and moves the swash plate 6a of the hydraulic pump 6 via a servo piston.

The discharge pressure P of the hydraulic pump 6 and the load pressure PLS of the hydraulic cylinder 31 are applied to the opposed pilot ports of the LS valve 14. And, a spring 14a which applies a prescribed differential pressure ΔPLS is disposed on the side on which the load pressure PLS acts.

The LS valve 14 operates to make the differential pressure ΔP between the discharge pressure P of the hydraulic pump 6 and the load pressure PLS of the hydraulic cylinder 31 to be a prescribed differential pressure ΔPLS and outputs a signal pressure according to the valve position to the servo valve 13. Thus, the servo valve 13 changes the swash plate 6a of the hydraulic pump 6 to change the discharge pressure P of the hydraulic pump 6 and adjusts the differential pressure ΔP between the discharge pressure P of the hydraulic pump 6 and the load pressure PLS of the hydraulic cylinder 31 to the prescribed differential pressure ΔPLS.

It is assumed that an open area of the spool of the operation valve 21 is A and a resistance coefficient is C, then a discharge flow rate Q of the hydraulic pump 6 is shown by the following expression (2):

$$Q = C \cdot A \cdot \sqrt{(\Delta P)} \qquad (2)$$

The differential pressure ΔP is made constant by the LS valve 14, so that the pump flow rate Q is changed by only the open area A of the spool of the operation valve 21.

When the working machine operation lever 41a is moved from its neutral position, the open area A of the spool of the operation valve 21 increases according to the operation amount, and the pump flow rate Q increases according to the increase of the open area A. At this time, the pump flow rate Q is determined based on only the operation amount of the working machine operation lever 41a without being affected by a magnitude of the hydraulic equipment load. Thus, when the LS valve 14 is disposed, the pump flow rate Q is changed as desired by an operator (according to the manipulated position of the operation lever) without being increased or decreased by a load. And, fine controllability, namely operability in an intermediate operation area, is improved.

The above description was made with reference to one hydraulic actuator, but when the plural hydraulic actuators 31 to 35 are disposed, the LS valve 14 operates in such a way that the differential pressure ΔP between the discharge pressure P of the hydraulic pump 6 and the load pressure (maximum load pressure) PLS of the hydraulic actuators 31 to 35 becomes the prescribed differential pressure ΔPLS.

A pressure compensation valve is also disposed to prevent a large amount of pressure oil from being supplied to a light-load hydraulic actuator when the plural operation valves 21 to 25 are operated at the same time, so that the differential pressures ΔP before and after each of the operation valves 21 to 25 are adjusted to be same.

The operation lever device 41 is provided with an operation sensor 41b for detecting the operation amount S from the neutral position of the operation lever 41a and the positioning at the neutral position. And, the operation signals indicating the operation amount S detected by the operation sensor 41b and the neutral position are input to the controller 7.

An "excavation power-up control" switch 42 is fitted to the knob of the operation lever 41a. When the switch 42 is turned on, an on signal ON is input to the controller 7.

Selection switches 51, 52, 53 for selecting the individual control modes of auto deceleration and a stop control mode are mounted on the monitor panel 50, and the selection switches 54, 55 for selecting the "power mode" and the "economy mode" as the working mode are also mounted. The selection switches 51, 52 are switches for selecting a "fuel consumption priority mode" and a "responsivity priority mode" as the control mode of the auto deceleration, and the selection switch 53 is a switch for selecting a "stop control mode". The selection switches 54, 55 are switches for selecting the "power mode" and the "economy mode" as the working mode operated by the construction machine. When any of the selection switches 51, 52, 53 is selected and operated as a control mode of the auto deceleration, a signal indicating the selected contents is input to the controller 7. And, when either the selection switch 54 or 54 is selected and operated for a working mode, a signal indicating the selected content is input to the controller 7.

The fuel dial 17 is used to set an instructed rotational speed of the engine 2. When the fuel dial 17 is operated to the maximum, a rated rotational speed NR is set as the instructed rotational speed. A signal indicating the set content of the fuel dial 17 is input to the controller 7.

A rotation speed sensor 15 for detecting the present real rotational speed Nc (rpm) of the engine 2 is attached to the output shaft 5 of the engine 2. A signal indicating the engine speed Nc detected by the rotation speed sensor 15 is input to the controller 7.

A discharge pressure sensor 61 for detecting a discharge pressure P of the hydraulic pump 6 and a swash plate angle sensor 62 for detecting the displacement D of the hydraulic pump 6 as a swash plate inclination angle are attached to the hydraulic pump 6. A signal indicating the discharge pressure P detected by the discharge pressure sensor 61 and a signal indicating the displacement D detected by the swash plate angle sensor 62 are input to the controller 7.

A load of the upper rotating body W2, namely a turning load Le, can be measured by detecting a voltage of the D.C. power line connecting the battery 10 and the inverter 9 by a voltage sensor 60. A signal indicating the voltage detected by the voltage sensor 60 is input to the controller 7, and the turning load Le is calculated from the input voltage. A torque sensor may be attached to the upper rotating body W2 to directly detect the turning load.

When the battery 10 is comprised of a capacitor, the present accumulated electric power of the battery 10, namely battery remaining E, can be detected by detecting the voltage of the battery 10 by the voltage sensor 16. A signal indicating the remaining E of the battery 10 detected by the voltage sensor 16 is input to the controller 7.

The controller 7 outputs a rotation command value N0 to the governor 3 to adjust a fuel injection amount to obtain a target rotational speed corresponding to the present hydraulic equipment load, thereby adjusting the rotational speed N and torque T of the engine 2.

The controller 7 outputs a generator motor torque command value TD to the inverter 8 to make the generator motor 4 perform a power generation operation or an electric operation. When a negative (−) polarity torque command value TD is given from the controller 7 to the inverter 8, the inverter 8 controls in such a way that the generator motor 4 operates as a generator. Specifically, the power torque produced by the engine 2 is partly transmitted to the drive axis of the generator motor 4 via the engine output shaft 5 to absorb the torque of the engine 2 so to generate electricity. And the A.C. power generated by the generator motor 4 is converted into D.C. power by the inverter 8 and accumulated (charged) in the battery 10 through the D.C. power line. Otherwise, the A.C. power generated by the generator motor 4 is converted into D.C. power by the inverter 8 and directly supplied to another inverter 9 through the D.C. power line.

When a positive (+) polarity torque command value TD is given from the controller 7 to the inverter 8, the inverter 8 controls so that the generator motor 4 operates as a motor. Specifically, the power is output (discharged) from the battery 10, the D.C. power accumulated in the battery 10 is converted into the A.C. power by the inverter 8 and supplied to the generator motor 4 so to rotate the drive axis of the generator motor 4. Otherwise, the D.C. power supplied from the other inverter 9 is converted into A.C. power by the inverter 8 and supplied to the generator motor 4 so to rotate the drive axis of the generator motor 4. Thus, the generator motor 4 produces torque, which is then transmitted to the engine output shaft 5 via the drive axis of the generator motor 4 and added to the power torque of the engine 2 (the power of the engine 2 is assisted). This added power torque is absorbed by the hydraulic pump 6.

Generated electricity (absorption torque amount) and electric operation amount (assist amount; generated torque amount) of the generator motor 4 are variable depending on the content of the torque command value TD.

The upper rotating body W2 is operated by an unshown turning operation lever.

According to the operation of the turning operation lever, the controller 7 outputs a positive polarity torque command value for operating the upper rotating body W2 to the inverter 9. When the positive (+) polarity torque command value is given from the controller 7 to the inverter 9, the inverter 9 controls to cause the turning generator motor 11 to operate as an electric motor. In other words, the D.C. power accumulated in the battery 10 or the D.C. power supplied from the other inverter 8 is converted into A.C. power by the inverter 9 and supplied to the turning generator motor 11 to rotate the drive axis of the swing machinery 12 so to rotate the upper rotating body W2.

When the upper rotating body W2 stops, the torque produced by the swing machinery 12 is transmitted to and absorbed by the drive axis of the turning generator motor 11 so to generate electricity. And, the A. C. power generated by the turning generator motor 11 is converted into D.C. power by the inverter 9 and accumulated (charged) in the battery 10 through the D.C. power line. Otherwise, the A.C. power generated by the turning generator motor 11 is converted into D.C. power by the inverter 9 and directly supplied to the other inverter 8 through the D.C. power line.

And, the controller 7 outputs a warning command to a buzzer 19 to sound it, outputs a display command to the monitor panel 50 to display the inside state, the control state, the contents of a warning or the like of the construction machine 1 on a display screen 50a of the monitor panel 50.

The details of control performed by the controller 7 will be described below.

First Control

Figure 4:
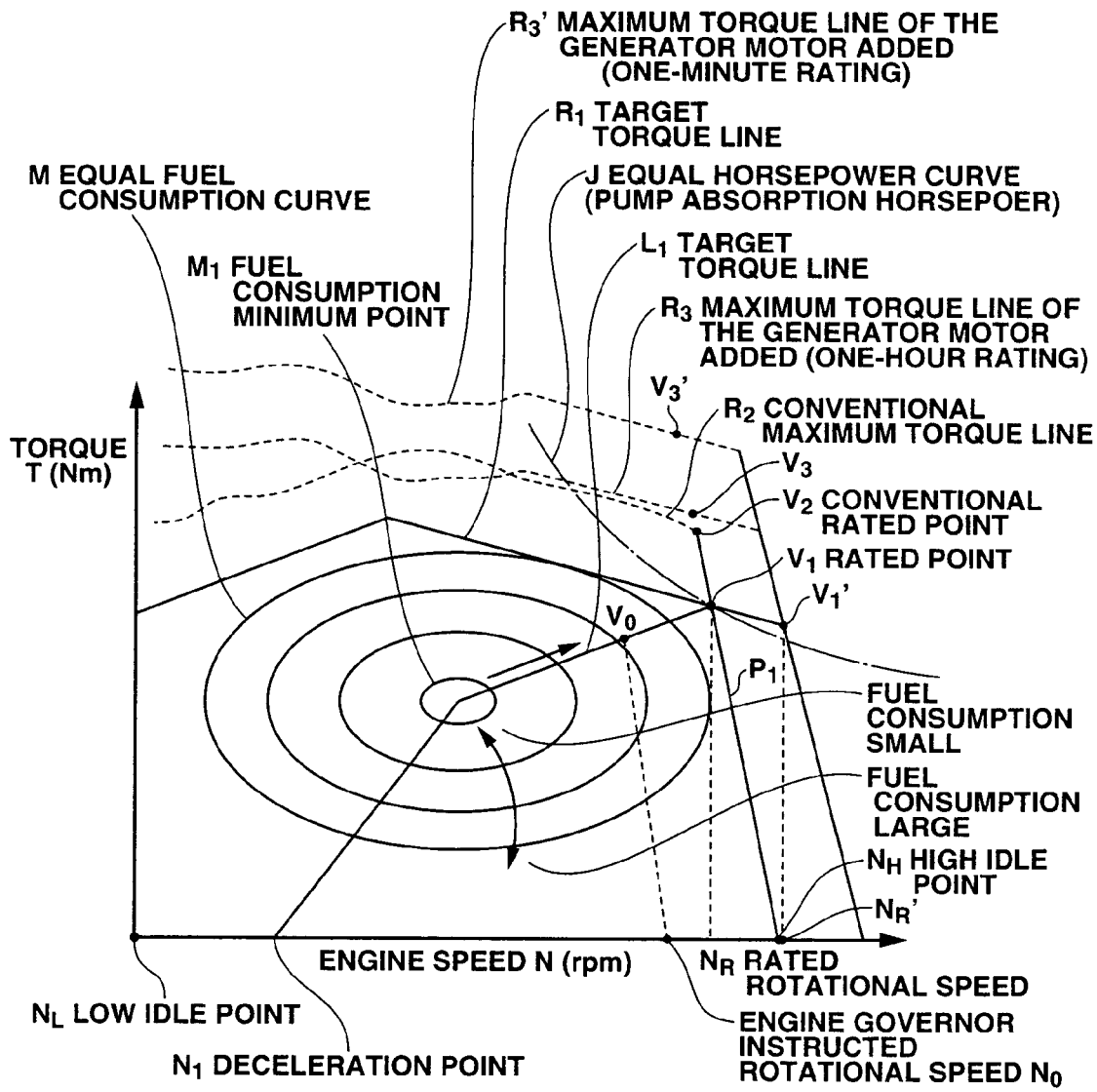
FIG. 4 is a diagram showing an engine torque diagram.

FIG. 4 shows a torque diagram of the engine 2, the horizontal axis represents the engine speed N (rpm; rev/min), and the vertical axis represents the torque T (N·m).

In FIG. 4, the area specified by the maximum torque line R1 indicates performance delivered by the engine 2. The engine 2 falls under no load at the high idle point NH, and the engine speed N becomes high idle rotational speed NH. The high idle rotational speed NH is a maximum rotational speed when the engine 2 is under no load. The power (horsepower) of the engine 2 becomes maximum at rated point V1 on the maximum torque line R1, and the engine speed N becomes rated rotational speed NR. "J" represents an equal horsepower curve having horsepower, which is absorbed by the hydraulic pump 6, be equal horsepower.

In FIG. 4, "M" represents an equal fuel consumption curve. The fuel consumption becomes minimum at M1 which is a valley of the equal fuel consumption curve M, and the fuel consumption increases from the fuel consumption minimum point M1 toward the outside. The fuel consumption in this case means the amount of fuel consumption for power of 1 kW in one hour, which is an index for the efficiency of the engine 2.

The engine 2 falls under no load at the deceleration point N1 at the auto deceleration, and the engine speed N becomes the deceleration rotational speed N1. Here, the auto deceleration means control to decrease the engine speed N to medium speed deceleration rotational speed N1 when all operation levers including the operation lever 41a are moved back to the neutral position and to increase the engine speed N from the deceleration rotational speed N1 to a rotational speed corresponding to a load when any of the operation levers is moved from the neutral position.

When the fuel dial 17 is operated to the maximum, the maximum engine speed is set to the rated rotational speed NR, and a line segment which connects the rated point V1 corresponding to the rated rotational speed NR, the fuel consumption minimum point M1 and the deceleration point N1 at the time of auto deceleration is set as the target torque line L1.

The controller 7 outputs an instructed rotational speed command value N0 to the governor 3 to adjust the speed to the target torque line L1. Thus, the governor 3 adjusts the fuel injection amount according to a hydraulic equipment load so to match at a point on the target torque line L1.

As the hydraulic equipment load becomes large, a matching point, where the power of the engine 2 and the pump absorption horsepower are balanced, moves toward the rated point V1 along the target torque line L1. The engine torque T and the engine speed N increase gradually as the matching point moves toward the rated point V1, the engine power becomes maximum at the rated point V1, and the engine speed N becomes the rated rotational speed NR.

When the fuel dial 17 is operated to set the rotational speed N0, which is smaller than the rated rotational speed NR, as the engine maximum rotational speed, a line segment, which connects the point V0 corresponding to the rotational speed N0, the fuel consumption minimum point M1 and the deceleration point N1 at the time of auto deceleration, is set as a target torque line.

The controller 7 outputs a rotation command value N0 to the governor 3 to match the rotational speed N0 as the upper limit rotational speed to a point on the target torque line L1. Thus, the governor 3 adjusts a fuel injection amount according to the hydraulic equipment load to have the rotational speed N0 as the upper limit rotational speed so to move the matching point on the target torque line L1.

As the hydraulic equipment load becomes large, the matching point moves along the target torque line L1 toward the rated point V1 to reach the point V0.

The controller 7 and the governor 3 control the engine 2 to match at the point on the target torque line L1 as described below.

Figure 19:
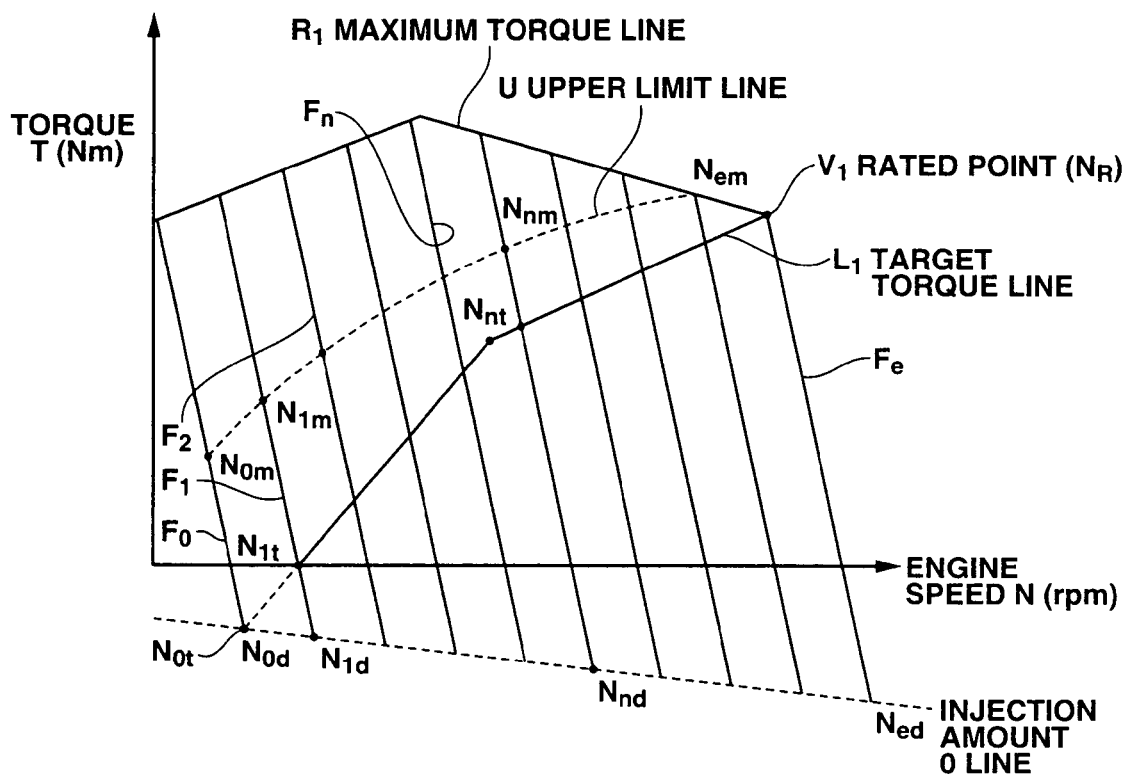
FIG. 19 is a diagram showing an engine torque diagram.

The controller 7 is set and configured to store the contents shown in FIG. 19. FIG. 19 is a diagram corresponding to FIG. 4.

As shown in FIG. 19, the controller 7 is set to have matching target rotational speeds N0t, N1t, . . . N1t . . . NR (rated points) on the target torque line L1. Individual instructed rotational speeds N0d, N1d, . . . Nnd . . . Ned are set in correspondence with the individual matching target rotational speeds N0t, N1t, . . . N1t . . . NR (rated points). The engine 2 has friction horsepower, so that a point at which a fuel injection amount becomes 0 is located below the line of the engine torque 0 in the torque diagram.

An upper limit line U specifying the maximum injection amount of fuel is set between the maximum torque line R1 and the target torque line L1 of the engine in the torque diagram.

Individual upper limit rotational speeds N0m, N1m, . . . Nnm . . . Nem on the upper limit line U are set in correspondence with the individual instructed rotational speeds N0d, N1d, . . . Nnd . . . Ned.

Individual regulation lines F0, F1, . . . Fn . . . Fe (maximum speed regulation lines) are set to connect the individual upper limit rotational speeds N0m, N1m, . . . Nnm . . . Nem, the individual matching target rotational speeds N0t, N1t, . . . N1t . . . NR (rated points) and the individual instructed rotational speeds N0d, N1d, . . . Nnd. . . Ned.

The controller 7 stores map data (N0d, N0t, N0m), (N1d, N1t, N1m) . . . (Nnd, Nnt, Nnm) . . . having the instructed rotational speeds, the matching target rotational speeds and the upper limit rotational speeds corresponded to one another in the storage table.

It is assumed that a load applied to the engine 2 becomes small and a real rotational speed Nnr of the engine 2 becomes higher than the matching target rotational speed Nnt.

Figure 20:
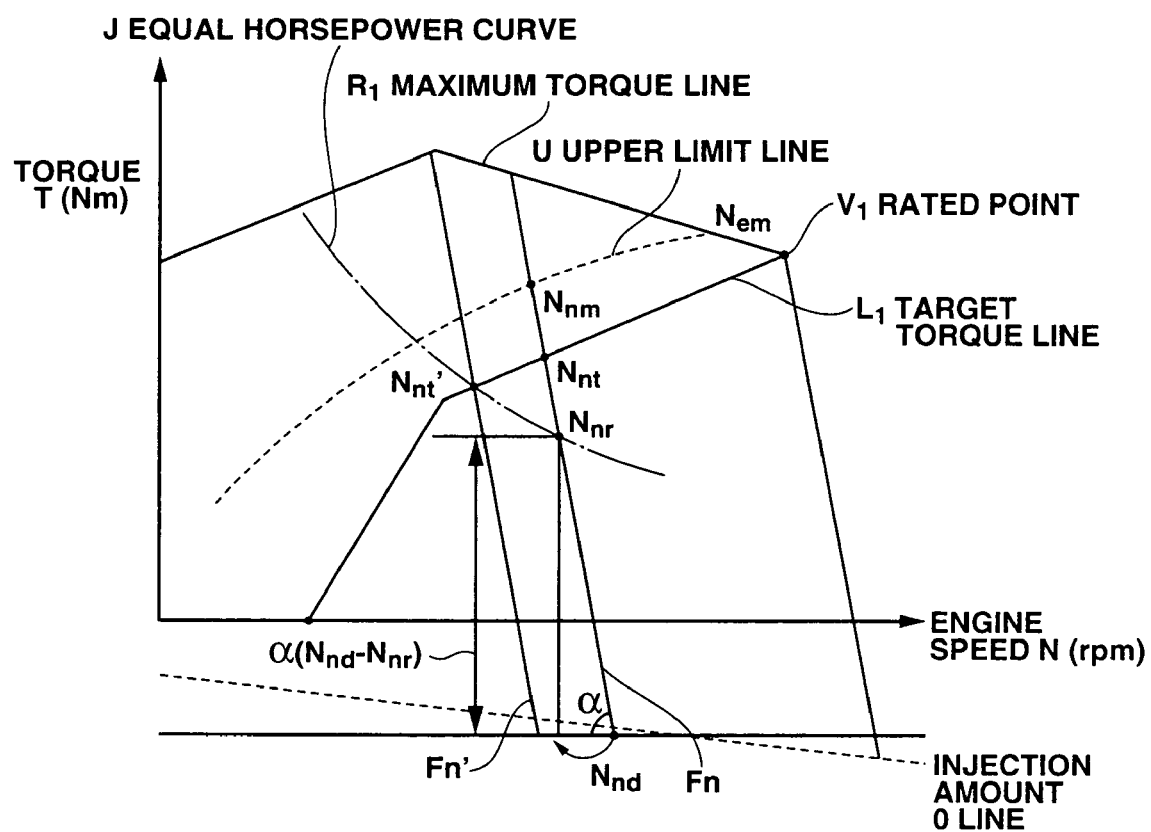
FIG. 20 is a diagram showing an engine torque diagram.

In this case, the governor 3 injects an injection amount α(Nnd−Nnr) of fuel corresponding to a difference between the instructed rotational speed Nnd and the real rotational speed Nnr to the engine 2 as shown in FIG. 20.

The controller 7 gives the governor 3 a command which changes the instructed rotational speed Nnd to Nnd' according to the difference Nnt-Nnr between the matching target rotational speed Nnt and the real rotational speed Nnr.

Thus, the regulation line moves from Fn to a regulation line Fn' which is on the same equal horsepower curve J as the present rotational speed Nnr and passes through the target torque line L1 and matches at a matching point Nnt' (matching target rotational speed Nnt') on the regulation line Fn'. Thus, the matching point moves from the point Nnt on the target torque line L1 to a point Nnt' with lower horsepower.

It was described above that the load applied to the engine 2 became small. The matching point also moves along the target torque line L1 according to a change in load when the load applied to the engine 2 becomes large.

The matching point can be moved sequentially along the target torque line L1 in response to the changes in the load of the engine 2 as described above.

As described above, this embodiment performs the control "to inject the injection amount α(Nnd−Nnr) of fuel according to the difference between the instructed rotational speed Nnd and the real rotational speed Nnr to the engine 2" and the control "to change the instructed rotational speed Nnd to Nnd' according to the difference Nnt-Nnr between the matching target rotational speed Nnt and the real rotational speed Nnr". But, it is desirable that the control "to change the instructed rotational speed Nnd to Nnd' according to the difference Nnt-Nnr between the matching target rotational speed Nnt and the real rotational speed Nnr" is performed late enough as compared with the control "to inject the injection amount α(Nnd−Nnr) of fuel according to the difference between the instructed rotational speed Nnd and the real rotational speed Nnr to the engine 2" so to accurately match them while preventing both the control from interfering.

Then, an operation when a load of the engine 2 has increased sharply will be described.

Figure 21:
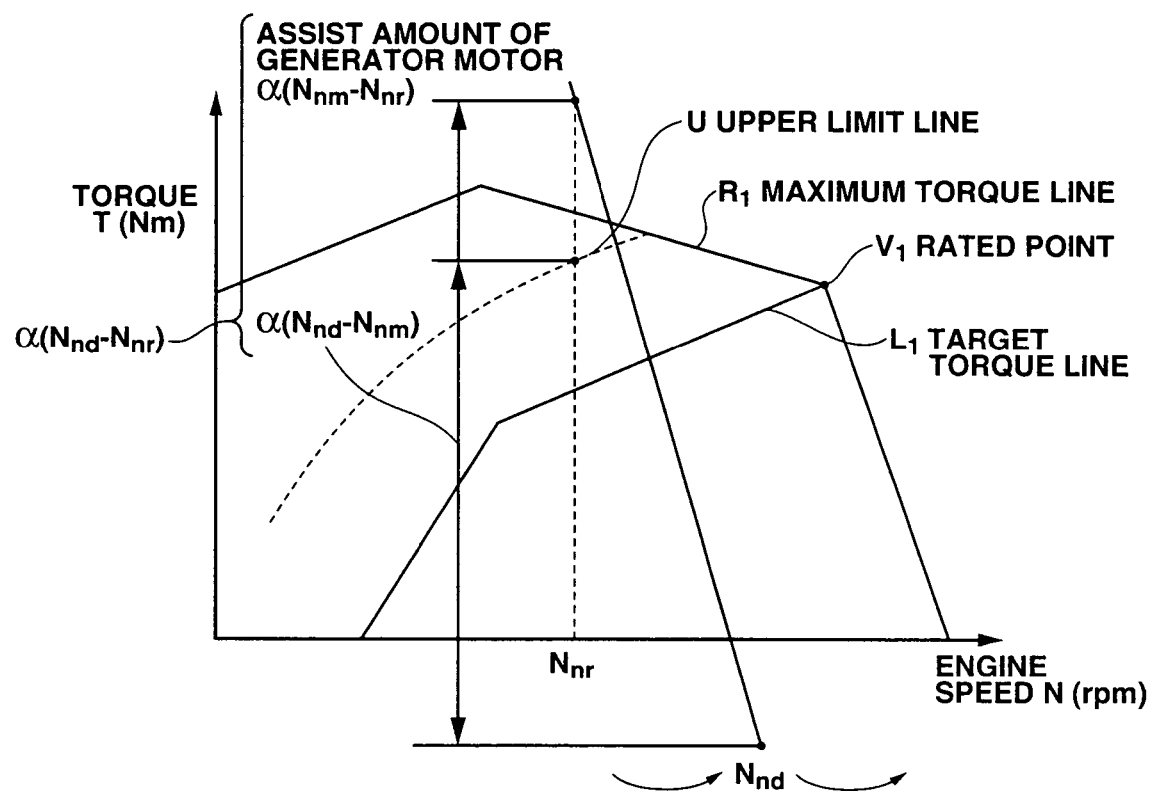
FIG. 21 is a diagram showing an engine torque diagram.

As shown in FIG. 21, when a load of the engine 2 increases sharply to accelerate the engine 2, the difference Nnd−Nnr between the instructed rotational speed Nnd and the real rotational speed Nnr becomes large. Here, when it is assumed that a large injection amount α(Nnd−Nnr) of fuel is injected from the governor 3 into the engine 2 according to the difference between the instructed rotational speed Nnd and the real rotational speed Nnr in order to meet the required acceleration, an air amount to the fuel is relatively insufficient, combustion efficiency of the engine 2 becomes worse, and black smoke is exhausted.

Then, when the injection amount α(Nnd−Nnr) corresponding to the difference Nnd−Nnr between the instructed rotational speed Nnd and the real rotational speed Nnr exceeds the maximum injection amount α(Nnd−Nnm) specified by the upper limit line U, the governor 3 injects the limited maximum injection amount α(Nnd−Nnm) of fuel to the engine 2, the controller 7 causes the generator motor 4 to perform an electric operation so to assist the remaining torque(α(Nnd−Nnr)−α(Nnd−Nnm)=α(Nnm−Nnr)) by the generator motor 4.

Figure 22:
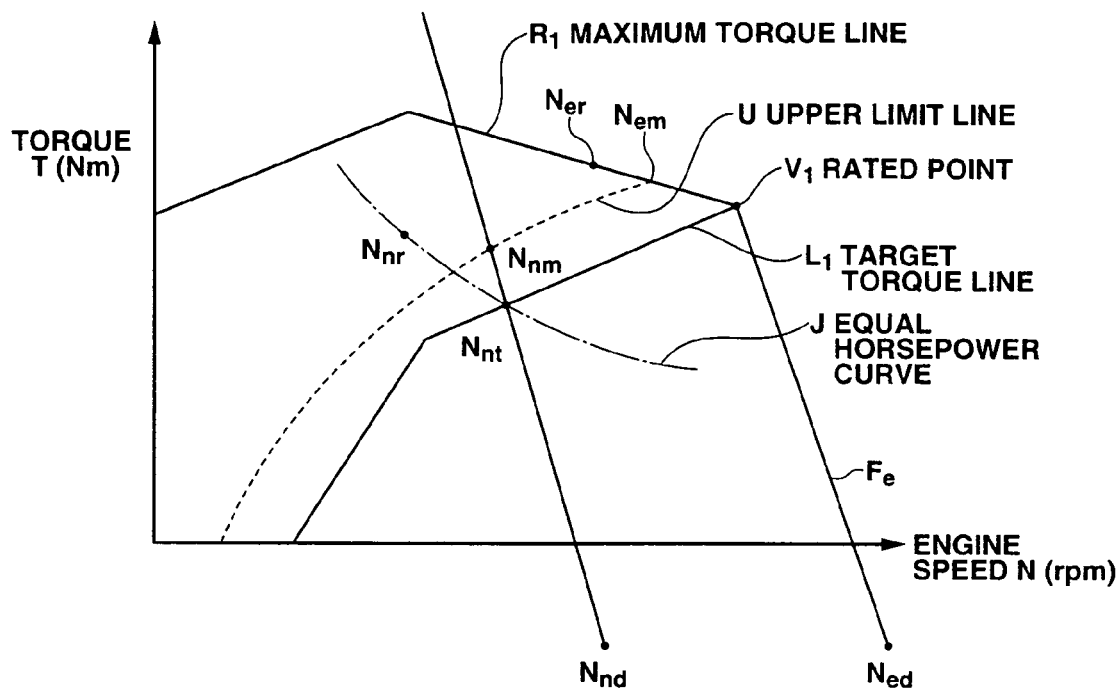
FIG. 22 is a diagram showing an engine torque diagram.

Specifically, when the engine real rotational speed Nnr becomes lower than the upper limit rotational speed Nnm as shown in FIG. 22, the controller 7 judges that the injection amount α(Nnd−Nnr) has exceeded the maximum injection amount α(Nnd−Nnm) specified by the upper limit line U and gives a positive torque command to the inverter 8 to generate the torque α(Nnm−Nnr) corresponding to the difference Nnm−Nnr between the upper limit rotational speed Nnm and the real rotational speed Nnr by the generator motor 4.

Thus, the power of the engine 2 is assisted by the generator motor 4 at the time of a sudden load, so that the engine efficiency can be improved while maintaining the acceleration, and the black smoke can be reduced.

Then, the effects of the first control will be described.

Figure 14:
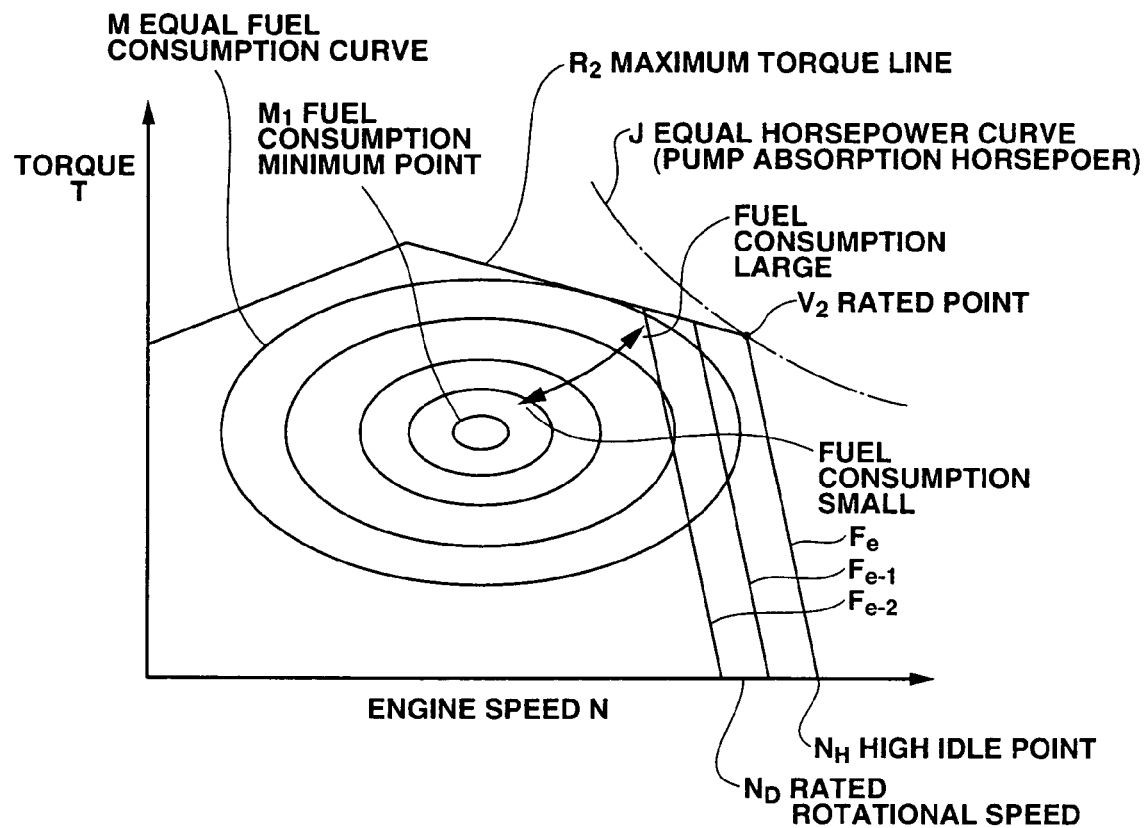
FIG. 14 is a diagram showing the torque diagram of a conventional engine.

FIG. 14 shows a conventional engine control method.

Specifically, when a maximum target rotational speed is set by the fuel dial 17, the governor 3 adjusts the speed on the maximum speed regulation line Fe connecting the rated point V2 and the high idle point NH. The matching point moves toward the rated point V2 on the maximum speed regulation line Fe as the hydraulic equipment load becomes large. When the matching point moves toward the rated point V2, the engine speed N is decreased gradually to become the rated rotational speed NR at the rated point V2. Regulation lines Fe-1, Fe-2 . . . are sequentially determined as the target rotational speed set by the fuel dial 17 becomes small, and the speed is adjusted on the individual regulation lines.

The engine 2 of the construction machine 1 is required to have adequate responsivity when the hydraulic equipment load becomes high. Specifically, the engine has good responsivity when a time in which the matching point moves from the no-load high idle point NH to the maximum load rated point V2 on the regulation line Fe is shorter.

In this connection, according to the conventional engine control method, the engine speed N is decreased gradually when the matching point moves toward the high load side on the regulation line Fe as described above. When the engine speed N lowers, the power accumulated in the flywheel of the engine 2 is momentarily released to the outside, and appearance power becomes larger than the real power of the engine 2. Therefore, the conventional engine control method is said having good responsivity.

As described above, the engine 2 can be made to follow the hydraulic equipment load with good responsivity according to the conventional engine control method, but there are disadvantages that the fuel consumption is large (poor) and the pump efficiency is low. The pump efficiency indicates efficiency of the hydraulic pump 6 specified by the displacement efficiency and the torque efficiency.

It is also apparent from FIG. 14 that the regulation line Fe corresponds to an area having a relatively high fuel consumption on the equal fuel consumption curve M. Therefore, according to the conventional engine control method, there was a disadvantage that the fuel consumption was large (poor) and not desirable in view of the engine efficiency.

Meanwhile, the variable displacement hydraulic pump 6 is generally known that, when the discharge pressure P is same, the displacement efficiency and the torque efficiency are high and the pump efficiency is high as the pump displacement D (swash plate inclination angle) is large.

It is also apparent from the expression (1) below that, when the pressure oil discharged from the hydraulic pump 6 has the same flow rate Q, the pump displacement D can be made large by decreasing the rotational speed N of the engine 2 to a lower level. Therefore, when the engine 2 is lowered its speed, the pump efficiency can be improved.

$$Q=N \cdot D \quad (1)$$

Therefore, the engine 2 may be operated in a low-speed area where the rotational speed N is low to enhance the pump efficiency of the hydraulic pump 6.

But, it is apparent from FIG. 14 that the regulation line Fe corresponds to the high rotational speed area of the engine 2. Therefore, the conventional engine control method had a disadvantage that the pump efficiency was low.

Meanwhile, according to the first control, the target torque line L1 is set in an area, where the fuel consumption is relatively small, on the equal fuel consumption line M as shown in FIG. 4, and the matching point moves along the target torque line L1.

Therefore, according to the first control, the engine 2 operates in the area where the fuel consumption is small (good), so that the engine efficiency can be enhanced.

The target torque line L1 shown in FIG. 4 corresponds to the area where the rotational speed N of the engine 2 becomes low and the displacement D of the hydraulic pump 6 is increased as compared with the regulation line Fe of FIG. 14.

According to the first control, the matching point moves on the target torque line L1 where the rotational speed N of the engine 2 becomes low and the displacement D of the hydraulic pump 6 is increased, so that the efficiency of the hydraulic pump 6 can be enhanced.

In this embodiment, the LS valve 14 is disposed, and when the operation amount S of the operation lever 41a is same, the flow rate Q is also same. It is seen from the above expression (1) (Q=N·D) that the pump displacement D can be increased and the pump efficiency can be enhanced when the rotational speed N of the engine 2 is made lower.

According to the first control, the matching point moves along the target torque line L1 where the rotation speed N of the engine 2 becomes low and the displacement D of the hydraulic pump 6 increases, so that when the engine 2 is lowered its speed, the pump displacement D can always be kept at a high level and the pump efficiency can be kept high while the operation lever 41a is being manipulated. Thus, according to the first control, operating characteristics which can improve the fine controllability and can keep the pump efficiency a high level by combining with the LS valve 14 can be realized Incidentally, when the matching point moves from a load-free state to a high load side, namely the rated point V1 side, on the target torque line L1 as indicated by an arrow in FIG. 4, the engine speed N is increased different from the conventional engine control method shown in FIG. 14.

Here, when it is assumed that a load-free rotation speed is set not to the medium speed deceleration rotational speed N1 but to a very low rotational speed, namely moved not to the deceleration point N1 but to the low idle point NL, on the target torque line L1, the flywheel of the engine 2 requires a long time to accelerate from a very low rotational speed to the rated rotational speed NR of a high rotation, and the responsivity of the engine 2 lowers. Conversely, when the load-free rotational speed is set to a level higher than the medium speed deceleration rotational speed N1, namely moved not to the deceleration point N1 but to the high idle point NH, a time required to reach the rated rotational speed NR can be decreased, and the responsivity of the engine 2 is improved. But, when the load-free rotational speed is set to the high-speed side, the engine 2 operates in an area where the fuel consumption is large (poor) in the same manner as the prior art (FIG. 14).

Considering such a tradeoff, the load-free rotational speed on the target torque line L1 is set to the medium speed deceleration rotational speed N1.

The deceleration rotational speed N1 (e.g., 1400 rpm) is a load-free rotational speed assuring that it takes only a short time (e.g., about 1 sec) to reach from the load-free state to the rated rotational speed NR when any of the operation levers is moved from the neutral position to apply the hydraulic equipment load.

Therefore, the movement of the matching point from the deceleration point N1 to the high load rated point V1 takes only a short time when the deceleration rotational speed N1 is set to the engine speed under no load. Thus, when the matching point is moved in the area where the fuel consumption is good as described above, the fuel consumption is improved, the engine efficiency is enhanced, and the engine 2 is lowered its speed. Thus, the pump efficiency is improved, and the responsivity of the engine 2 can be prevented from lowering.

Second Control

The above described first control sets the line segment, which connects the rated point V1, the fuel consumption minimum point M1 and the deceleration point N1, as the target torque line L1, and performs matching on the target torque line L1. But, the line segment is not strictly required to pass through the fuel consumption minimum point M1, but a line segment, which passes by the fuel consumption minimum point M1, may be set as the target torque line, and matching may be made on this target torque line. The line segment is not strictly required to pass through the deceleration point N1, but a line segment passing by the deceleration point N1 may be set as the target torque line so to match on the target torque line.

Figure 5:
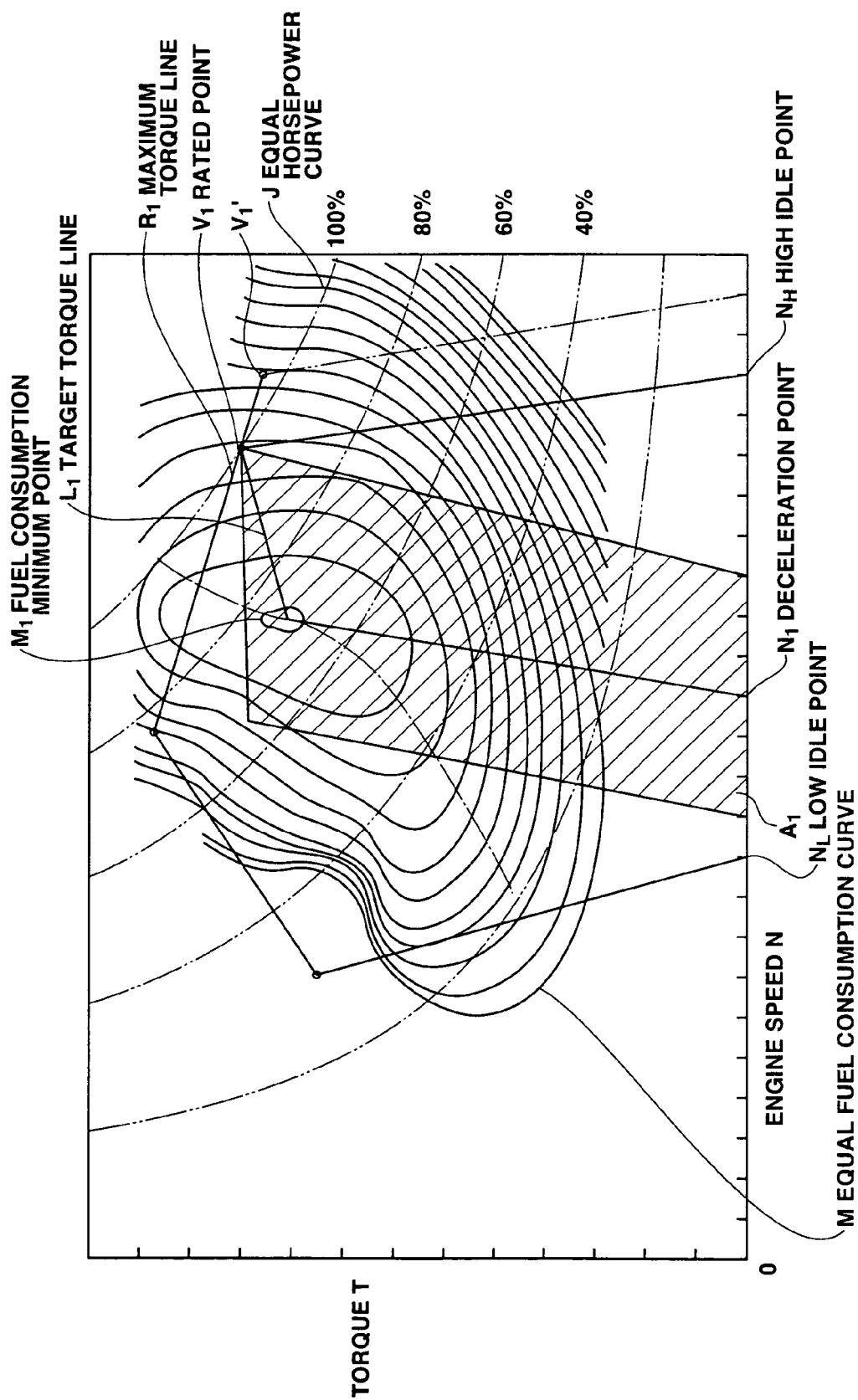
FIG. 5 is a diagram showing an engine torque diagram.

Specifically, the target torque line may be set in the vicinity of the target torque line L1 or within the area A1 where the engine speed is approximately ±300 rpm as shown in FIG. 5. For example, a line segment which connects the rated point V1, the fuel consumption minimum point M1 and a load-free point having the same rotational speed as the fuel consumption minimum point M1 can be determined as the target torque line L1'. The same effect as that of the first control can be obtained by setting the target torque line within the area A1.

Third Control

The above described first control sets the line segment, which connects the rated point V1, the fuel consumption minimum point M1 and the deceleration point N1, as the target torque line L1, and performs matching on the target torque line L1. But, the target torque line including at least the line segment connecting the rated point V1 and the fuel consumption minimum point M1 is adequate, and it is not necessarily required to be the target torque line which passes through or the vicinity of the deceleration point N1 as shown in FIG. 5.

Figure 6:
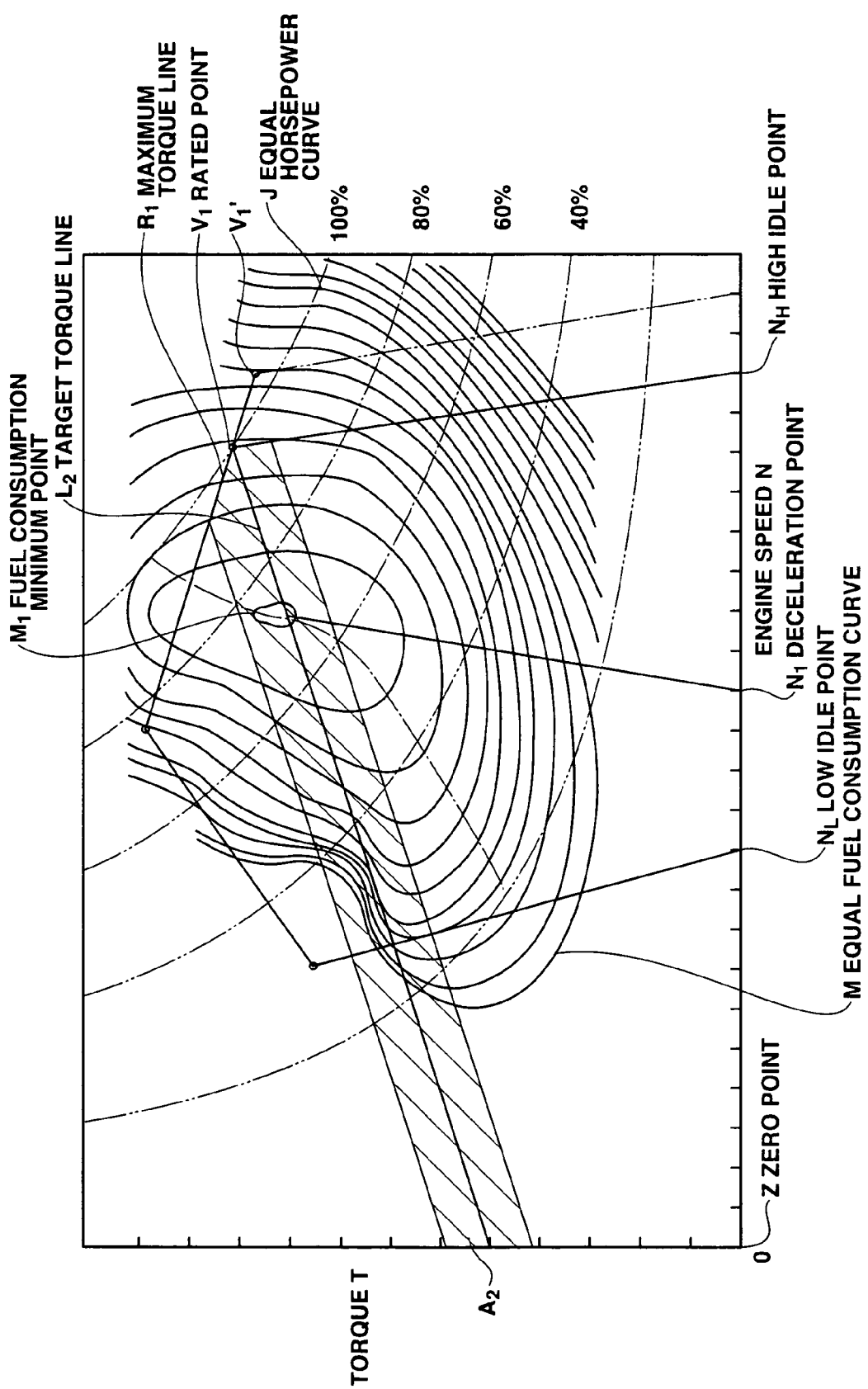
FIG. 6 is a diagram showing an engine torque diagram.

For example, a line segment extended from the line segment, which connects the rated point V1 and the fuel consumption minimum point M1, may be determined as a target torque line L2, and matching may be made on the target torque line L2 as shown in FIG. 6.

As shown in FIG. 6, the target torque line may be set in the vicinity of the target torque line L2 or within the area A2 where the engine speed is approximately ±300 rpm.

According to the third control, the responsivity of the engine 2 is somewhat degraded as compared with the first control but the engine 2 operates in the area, where the fuel consumption is small (good), in the same way as the first control, so that the engine efficiency can be enhanced. Because the engine 2 is lowered its speed to a lower level as compared with the first control, the engine 2 can be operated in an area where the pump efficiency is higher, and the efficiency of the hydraulic pump 6 can be enhanced furthermore.

Fourth Control

The above described first control sets the line segment, which connects the rated point V1, the fuel consumption minimum point M1 and the deceleration point N1, as the target torque line L1, and the matching point is moved along the target torque line L1. But, a line segment which connects the rated point V1 and the deceleration point N1 may be determined as the target torque line L3 as shown in FIG. 7, and matching may be made on the target torque line L3.

Figure 7:
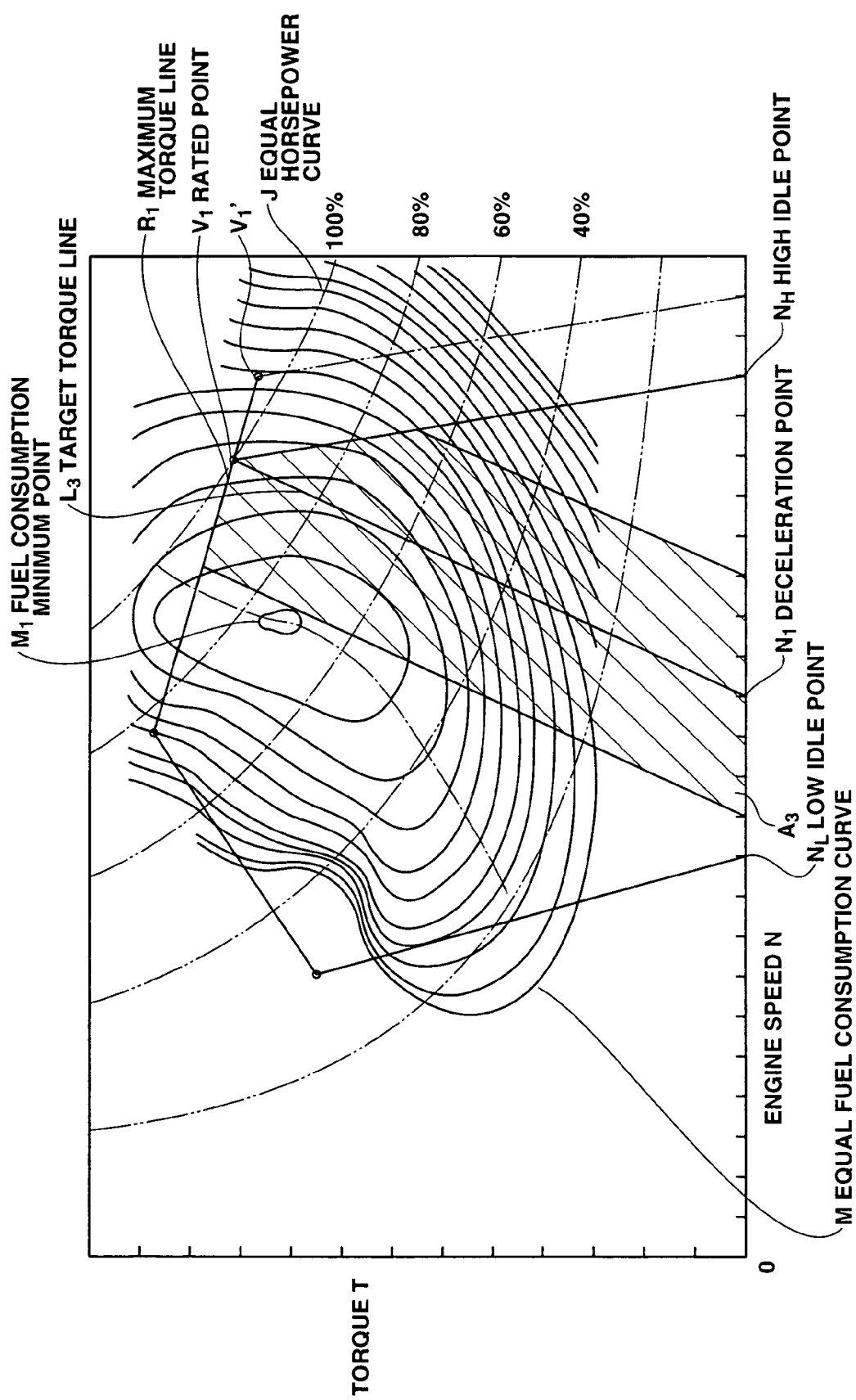
FIG. 7 is a diagram showing an engine torque diagram.

As shown in FIG. 7, the target torque line may be set in the vicinity of the target torque line L3 or in an area A3 where the engine speed is approximately ±300 rpm.

According to the fourth control, the engine 2 is faster as compared with the first control, so that the responsivity of the engine 2 can be further improved though the pump efficiency is somewhat degraded.

Fifth Control

Figure 8:
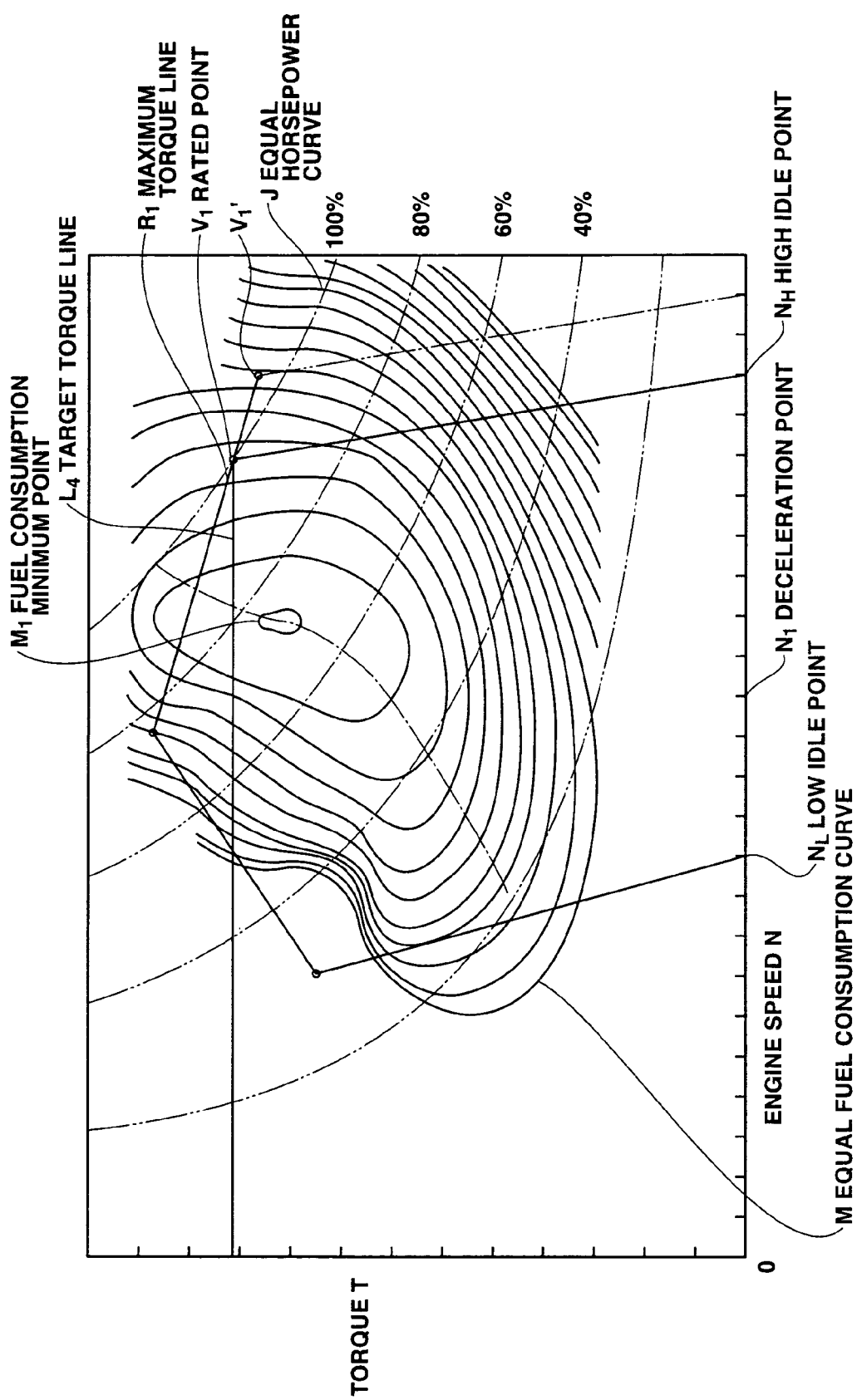
FIG. 8 is a diagram showing an engine torque diagram.

The above described first control sets the line segment, which connects the rated point V1, the fuel consumption minimum point M1 and the deceleration point N1, as the target torque line L1, and performs matching on the target torque line L1. But, a line segment parallel to the engine speed shaft which is kept at the same torque as that of the rated point V1 as shown in FIG. 8 may be set as a target torque line L4, and matching may be made on the target torque line L4.

According to the fifth control, the responsivity of the engine 2 is degraded as compared with the first control, and the engine 2 operates in the area where the fuel consumption is low (good) in the same way as the first control, so that the engine efficiency can be enhanced. The engine 2 becomes slower as compared with the first control or the third control, so that the engine 2 can be operated in the area where the pump efficiency is high, and the efficiency of the hydraulic pump 6 can be enhanced furthermore.

Sixth Control

Figure 17:
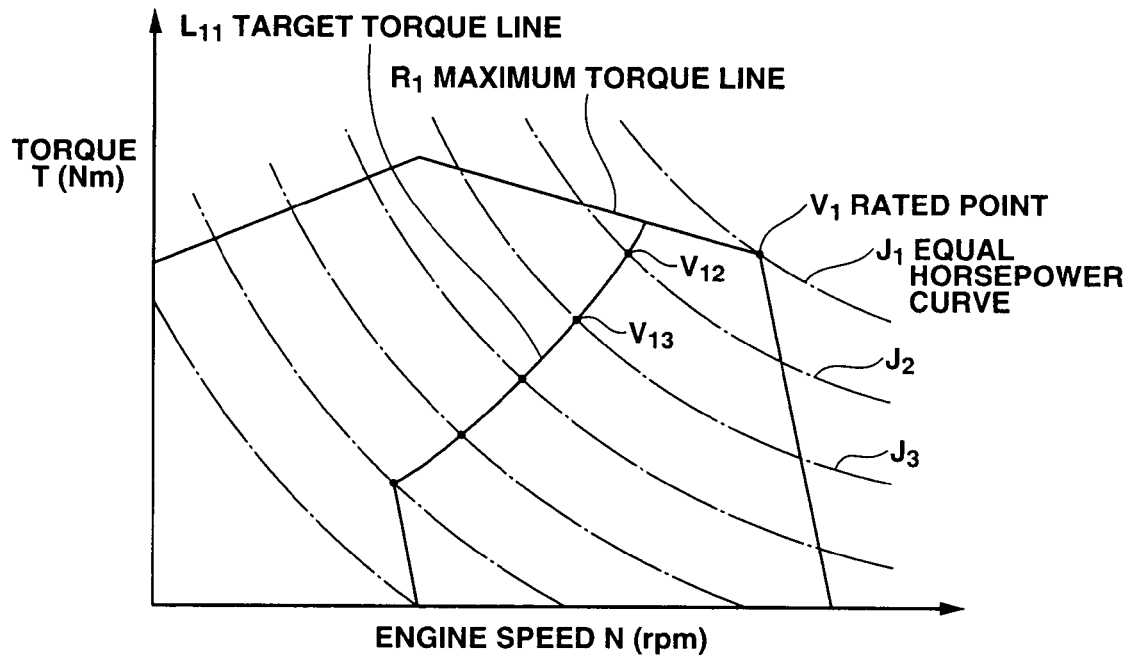
FIG. 17 is a diagram showing an engine torque diagram.

The above described first control sets the line segment, which connects the rated point V1, the fuel consumption minimum point M1 and the deceleration point N1, as the target torque line L1, and performs matching on the target torque line L1. But, as shown in FIG. 17, the target torque line L11 passing fuel consumption minimum points V1, V12, V13 . . . where the fuel consumption rate becomes minimum on the individual equal horsepower curves J1, J2, J3 . . . of the torque diagram or the vicinity of the fuel consumption minimum points V1, V12, V13 . . . may be determined, and the engine 2 may be controlled in the same manner as the first control so that matching is made at a point on the target torque line L11.

According to the sixth control, when the matching point moves along the target torque line L11 according to a change in load of the engine 2, the engine 2 can always be operated with the fuel consumption in the minimum or substantially minimum state, so that the engine efficiency can be enhanced.

Seventh Control

Figure 18:
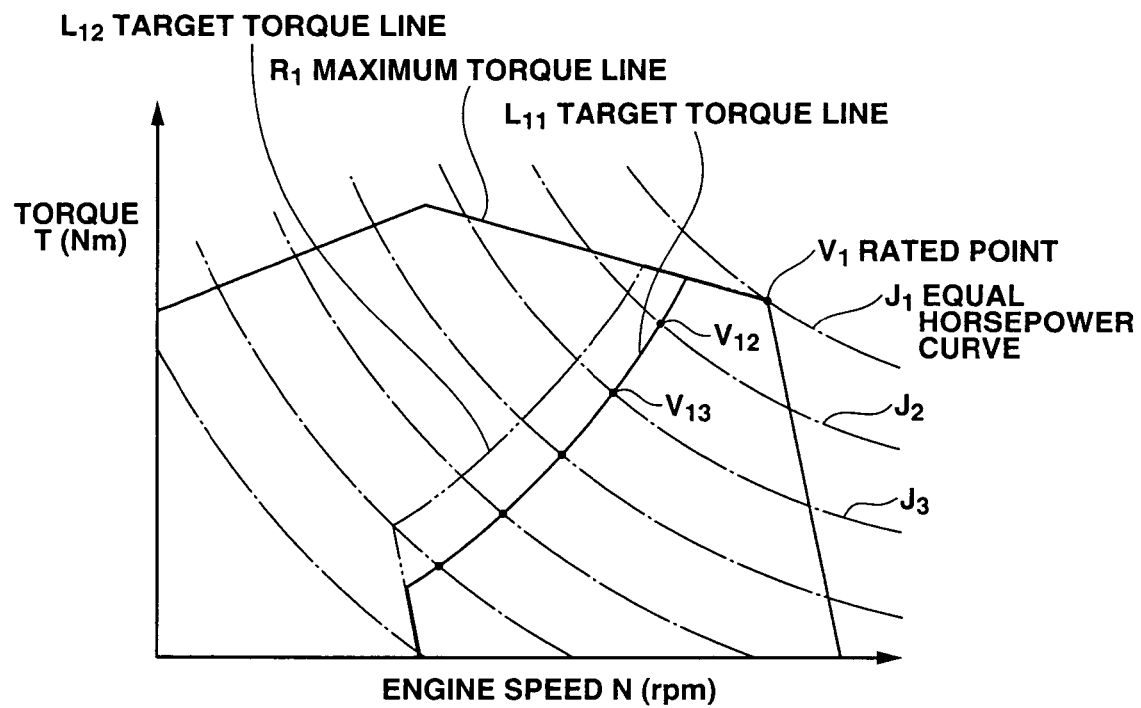
FIG. 18 is a diagram showing an engine torque diagram.

As shown in FIG. 18, a second target torque line L12 where the engine 2 has a low rotational speed N and the hydraulic pump 6 has a large displacement D may be set with respect to a first target torque line L11 passing through fuel consumption minimum points V1, V12, V13 . . . , where the fuel consumption rate becomes minimum, on the individual equal horsepower curves J1, J2, J3 . . . of the torque diagram or the vicinity of the fuel consumption minimum points V1, V12, V13 . . . , and the engine 2 may be controlled in the same way as the first control so that the matching is made at a point on the target torque line L12.

When the matching is made at a point on the second target torque line L12, the fuel consumption becomes large but the rotational speed becomes low and the displacement D of the hydraulic pump 6 can be made large as compared with the case that the matching was made at a point on the first target torque line L11, so that the efficiency of the hydraulic pump 6 is improved, and larger engine horsepower can be obtained when the engine speed is same. As a result, total efficiency of the engine 2 and the hydraulic pump 6 is improved, and the work can be performed efficiently by a larger engine power.

Eighth Control

A first target torque line L11 passing through fuel consumption minimum points V1, V12, V13 . . . , where the fuel consumption rate becomes minimum on the individual equal horsepower curves J1, J2, J3 . . . of the torque diagram, or the vicinity of the fuel consumption minimum points V1, V12, V13 . . . is set as shown in FIG. 18, and a second target torque line L12, where the engine 2 has a low rotational speed N and the hydraulic pump 6 has a large displacement D, is set with respect to the first target torque line L11. And, they can be selected according to the work performed by the construction machine 1.

The selection switches 54, 55 for a "power mode" and an "economy mode" are disposed on the monitor panel 50 of FIG. 2, when either the first target torque line L11 or the second target torque line L12 is selected by the selection switch 54 or 55, the controller 7 controls the engine 2 by giving a command to the governor 3 to make matching at a point on the selected target torque line.

When the second target torque line L12 is selected, matching is made at a point on the second target torque line L12. When the matching is made at a point on the second target torque line L12, the fuel consumption becomes large, the rotational speed becomes low and the displacement D of the hydraulic pump 6 can be made large as compared with the matching made at a point on the first target torque line L11, so that the efficiency of the hydraulic pump 6 is improved, and a larger engine horsepower can be obtained when the engine speed is same. As a result, total efficiency of the engine 2 and the hydraulic pump 6 is improved, and the work can be performed efficiently by larger engine power (power mode).

When the first target torque line L11 is selected, matching is made at a point on the first target torque line L11. When the matching is made at a point on the first target torque line L11, the engine power drops and the work efficiency becomes low as compared with the case that the matching is made at the point on the second target torque line L12. But, the engine 2 can be operated with the fuel consumption in the minimum or substantially minimum state, and the engine efficiency can always be enhanced (economy mode).

Therefore, the engine 2 can always be operated in an optimum mode by selecting even if the work condition is changed and can deal with the change in the work conditions.

The first control to the eighth control described above were described provided that they were used for a hybrid system using both the engine 2 and the generator motor 4 as the drive source shown in FIG. 1 and FIG. 2. But, the first control to the eighth control may be performed for a system having only the engine 2 as a drive source under hydraulic equipment load.

Ninth Control

According to the first control described above, the medium speed deceleration rotational speed N1 is set to the engine speed under no load, so that the responsivity of the engine 2 can be enhanced when the matching point moves toward the high load side on the target torque line L1, but the responsivity of the engine 2 may be further improved by assisting the engine power by the generator motor 4.

Specifically, as indicated by the arrow in FIG. 4, when it is judged by the controller 7 that the matching point moves on the target torque line L1 in a direction that hydraulic equipment load applied to the output shaft 5 becomes large, a positive (+) polarity torque command value TD is given from the controller 7 to the inverter 8, and the generator motor 4 operates as an electric motor.

For example, a deviation between the engine target rotational speed (instructed rotational speed) NR and the engine real rotational speed Nc detected by the rotation speed sensor 15 is determined, and it is judged from the obtained deviation that the matching point moves on the target torque line L1 in a direction that the hydraulic equipment load becomes large.

When the hydraulic equipment load LR is measured to find that the hydraulic equipment load LR is increasing, it may be judged that the matching point moves on the target torque line L1 in a direction that the hydraulic equipment load becomes large. When the operation amount S of the operation lever detected by the operation sensor 41b becomes large, it may be judged that the matching point moves on the target torque line L1 in a direction that the hydraulic equipment load becomes large.

According to the ninth control, the power of the generator motor 4 is added to the power of the engine 2 when the matching point moves from the no load deceleration point N1 to the high load rated point V1. For a portion that the engine power is assisted by the power of the generator motor 4, the time for accelerating the flywheel of the engine 2 becomes short, and the movement to the rated point V1 can be made in a short time. Therefore, according to the ninth control, the responsivity of the engine 2 can be further enhanced as compared with the first control.

And, the ninth control can be performed in combination with any of the second control, the third control, the fourth control, the fifth control, the sixth control, the seventh control and the eighth control described above. Specifically, the engine power may be assisted by the power of the generator motor 4 when the matching point moves toward the high load side on the target torque line set in the areas A1, A2, A3 shown in FIG. 5, FIG. 6 and FIG. 7, and the engine power may be assisted by the power of the generator motor 4 when the matching point moves on the target torque line L4 toward the high load side as shown in FIG. 8. And, the engine power may be assisted by the power of the generator motor 4 when the matching point moves on the target torque line L11 toward the high load side as shown in FIG. 17. And the engine power may be assisted by the power of the generator motor 4 when the matching point moves on the target torque line L12 toward the high load side as shown in FIG. 18.

Here, the expression of energy in the device configurations shown in FIG. 1 and FIG. 2 will be described.

Energy conservation expression shown below is established among the power EM of the generator motor 4, the hydraulic equipment load LR and the engine power LD (or Lc).

$$\text{Generator motor power } EM = \text{hydraulic equipment load } LR - \text{engine power } LD(Lc) \quad (11)$$

It is assumed in the expression (11) that the polarity of EM is positive when the generator motor 4 performs an electric operation. The expression (11) can be rewritten as follows.

$$\text{Engine power } LD\ (Lc) + \text{generator motor power } EM = \text{hydraulic equipment load } LR \quad (11a)$$

And, the following energy conservation expression is established among the power CD of the battery 10, the power EM of the generator motor 4 and the power Le of the turning generator motor 11.

$$\text{Battery power } CD = \text{generator motor power } EM + \text{turning generator motor power } Le \quad (12)$$

In the above expression (12), it is assumed that, when the battery 10 is discharging or the power is being output from the battery 10, the polarity of CD is positive, when the generator motor 4 is performing the electric operation, the polarity of EM is positive, and when the turning generator motor 11 is performing the electric operation, the polarity of Le is positive.

When the generator motor power EM is erased by using the expression (11) (or the expression (11a)) and the expression (12), the following energy conservation expression is established among the power LD of the engine 2, the power CD of the battery 10, the hydraulic equipment load LR and the power Le of the turning generator motor 11.

$$\text{Engine power } LD\ (Lc) + \text{battery power } CD = \text{hydraulic equipment load } LR + \text{turning generator motor power } Le \quad (13)$$

The power Le of the turning generator motor 11 represents a load of the upper rotating body W2, namely a turning load Le.

The expressions (11) to (13) are on condition that the upper rotating body W2 is driven by an electric motor, but when the inverter 9 and the turning generator motor 11 are removed from the structures shown in FIG. 1 and FIG. 2 and the upper rotating body W2 is operated by a hydraulic actuator in the same manner as the other boom W1 and the like, the same energy conservation expression is established. In such a case, the following expressions (21), (22) and (23) corresponding to the expressions (11), (12) and (13) are established.

Generator motor power $EM$=hydraulic equipment load $LR$−engine power $LD$ ($Lc$)    (21)

Battery power $CD$=generator motor power $EM$    (22)

Engine power $LD$ ($Lc$)+battery power $CD$=hydraulic equipment load $LR$    (23)

The control described below is on condition that the expressions (11), (12) and (13) are established, but when the upper rotating body W2 is operated by a hydraulic actuator and the expressions (21), (22) and (23) are established, the control given below can be applied in the same way.

The control will be described with reference to FIG. 3.

Tenth Control

An embodiment capable of decreasing an energy loss of the hybrid system shown in FIG. 1 and FIG. 2 will be described.

Specifically, the controller 7 calculates a turning load or the power Le of the turning generator motor 11 from a voltage detected by the voltage sensor 60. And, absorption torque of the hydraulic pump 6 is calculated based on the discharge pressure P detected by the discharge pressure sensor 61 and the displacement D detected by the swash plate angle sensor 62, and the hydraulic equipment load LR which is the absorption horsepower of the hydraulic pump 6 is calculated based on the pump absorption torque and the rotational speed Nc (rotational speed Nc of the engine 2) of the hydraulic pump 6 detected by the rotation speed sensor 15 (step 101).

Here, minimize an energy loss by minimizing a charging/discharging loss of the battery 10, a generation loss of the generator motor 4 and a motor loss in the structures of FIG. 1 and FIG. 2, the battery power CD is advisably minimized in the expression (13) (engine power LD (Lc)+battery power CD=hydraulic equipment load LR+turning generator motor power Le), and it is adequate when the expression (14) below is established by making the battery power CD zero in the expression (13).

Engine power $LD$=hydraulic equipment load $LR$+turning generator motor power $Le$    (14)

The total of the hydraulic equipment load LR and the turning generator motor power Le calculated in the step 101 is assumed to be an actuator side required power, and the actuator-side required power comprising the hydraulic equipment load LR and the turning generator motor power Le is substituted in the expression (14) to determine the engine power LD. And, the controller 7 controls the engine 2 to obtain the engine power LD.

Where it is determined to operate the upper rotating body W2 by the hydraulic actuator, it is adequate if the expression (24) below is established by making the battery power CD zero in the expression (23).

Engine power $LD$=hydraulic equipment load $LR$    (24)

And, the hydraulic equipment load LR calculated in the step 101 is substituted in the expression (24) to determine the engine power LD, and the engine 2 may be controlled to obtain the engine power LD.

The engine control will be described specifically with reference to steps 103, 104 and 106 of FIG. 3.

The engine 2 is assumed to be operated along the target torque line L1 shown in FIG. 4.

Specifically, the target torque line L1 is stored in a memory, the target torque line L1 is read (step 103), and the target torque line L1 is converted into an engine power line G. In other words, the relation L1 between the engine speed N and the torque T is converted into the relation G between the engine power LD and the engine target rotational speed ND. Then, the engine target rotational speed ND corresponding to the engine power LD calculated from the expression (14) is determined from the engine power line G (step 104). The controller 7 outputs a rotation command value N0, which converts the engine speed N into the engine target rotational speed ND, to the governor 3. As a result, a fuel injection amount is adjusted to match on the target torque line L1, the engine speed N agrees with the engine target rotational speed ND, and the engine 2 generates the engine power LD (step 106).

Because the battery power CD is zero in the expression (12) (battery power CD=generator motor power EM+turning generator motor power Le), when the generator motor 4 is generating electric power, the power generated by the generator motor 4 is not accumulated in the battery 10 but directly used for a turning operation of the turning generator motor 11. Specifically, when the generator motor 4 generates electric power, A.C. power generated by the generator motor 4 is converted into D.C. power by the inverter 8 and directly supplied to the other inverter 9 through the D.C. power line, and the turning generator motor 11 performs an electric operation.

Similarly, when the turning generator motor 11 is generating electric power, the electric power generated by the turning generator motor 11 is not accumulated in the battery 10 but directly used for the turning operation of the generator motor 4. In other words, when the turning generator motor 11 generates electric power, the A.C. power generated by the turning generator motor 11 is converted into D.C. power by the inverter 9 and directly supplied to the other inverter 8 through the D.C. power line, and the generator motor 4 performs an electric operation.

Thus, according to the tenth control, the engine 2 is controlled to make the battery power CD zero, so that an energy loss can be minimized by minimizing a charging/discharging loss of the battery 10, a generation loss of the generator motor 4 and a motor loss, and the fuel consumption of the engine 2 can be reduced.

Eleventh Control

An embodiment capable of downsizing the engine 2 will be described.

FIG. 4 shows maximum torque lines R3, R3' obtained by adding the maximum torque line R1 of the engine 2 of this embodiment, the maximum torque line R2 (see FIG. 14) of a conventional engine and the maximum torque line of the generator motor 4 of this embodiment to the maximum torque line R1 of the engine 2 of this embodiment. The maximum torque line R3 is a maximum torque line at a one-hour rated power of the generator motor 4, and the maximum power is obtained at the rated point V3. The maximum torque line R3' is a maximum torque line at a one-minute rated power of the generator motor 4, and the maximum power is obtained at the rated point V3'.

As shown in FIG. 4, the engine 2 of this embodiment is smaller than the conventional engine and operates at the rated point V1 where the engine power is lower than at the conventional rated point V2. The power of the engine 2 at the rated point V1, namely the upper limit of power, is determined as LM (see step 104 of FIG. 3).

When the hydraulic equipment load LR and the turning generator motor power Le are calculated in the step 101, the sum of the hydraulic equipment load LR and the turning generator motor power Le according to the expression (14) is determined as the actuator side required power, and it is judged whether the actuator side required power LR+Le exceeds the upper limit LM of the engine power LD.

As a result, when the actuator side required power LR+Le exceeds the upper limit LM of the engine power LD, a positive (+) polarity torque command value TD is given from the controller 7 to the inverter 8 so that power (LR+Le−LM) corresponding to the exceeded load equivalent can be obtained as the power EM of the generator motor 4. As a result, the generator motor 4 operates as an electric motor and generates the power (LR+Le−LM) corresponding to the load equivalent exceeding the upper limit LM of the engine power as the generator motor power EM.

When the generator motor 4 is operating continuously at hourly rated power, matching is made at the rated point V3 with the maximum load to assist the power of the engine 2. As shown in FIG. 4, horsepower having the same or higher engine power is generated at the rated point V3 compared with the rated point V2 of the conventional engine. When the generator motor 4 operates with the minutely rated power for a short time, matching is made at the rated point V3' when the load is maximum to generate horsepower larger than that at the rated point V3 at hourly rating, and horsepower far higher than that of the conventional engine is generated.

When the upper rotating body W2 is operated by the hydraulic actuator, the hydraulic equipment load LR is assumed to be the actuator side required power from the expression (24), and it is judged whether the actuator side required power LR exceeds the upper limit LM of the engine power LD. And, when the actuator side required power LR exceeds the upper limit LM of the engine power LD, positive (+) polarity torque command value TD is given from the controller to the inverter 8 so that the exceeded load-corresponding power (LR−LM) can be obtained as the power EM of the generator motor 4.

Thus, the engine 2 is downsized by the eleventh control, the cost is improved, the rear view is improved, and noise is lowered, and if a large load is produced during operation, appropriate measures can be taken.

Twelfth Control

Then, an embodiment capable of reducing the fuel consumption of the engine 2 will be described.

To reduce the fuel consumption of the engine 2, the target torque line is determined in an area where the fuel consumption rate is small on the equal fuel consumption curve M and the engine 2 is controlled so that the matching point moves on the target torque line as described above in connection with the first control to the eighth control.

It is assumed in the description below that the target torque line L1 shown in FIG. 4 and FIG. 5 is the target torque line (see step 103 of FIG. 3).

Figure 10:
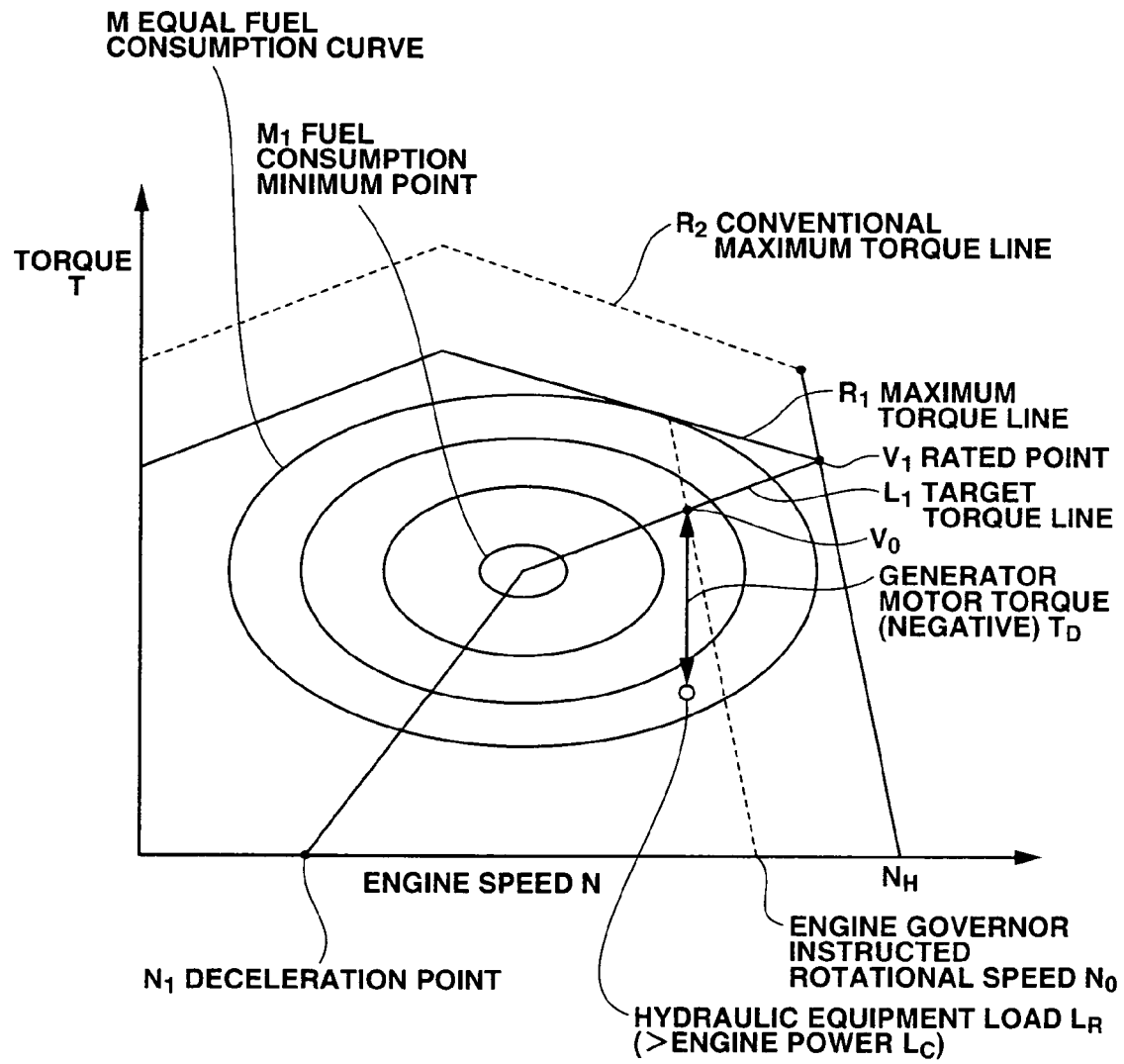
FIG. 10 is a diagram showing an engine torque diagram.

As shown in FIG. 10, when a rotation command value N0 indicating the rotational speed N0 is output from the controller 7 to the governor 3, the rotational speed N of the engine 2 is set to the rotational speed N0, matching is made at point V0 on the target torque line L1, and the engine 2 generates the engine power Lc.

When the hydraulic equipment load LR is small and the hydraulic equipment load LR is not more than the real engine power Lc, the controller 7 controls the generator motor 4 from the expression (11) or (21) (generator motor power EM=hydraulic equipment load LR−engine power Lc) so that the power corresponding to the difference Lc−LR is absorbed by the generator motor 4.

Figure 9:
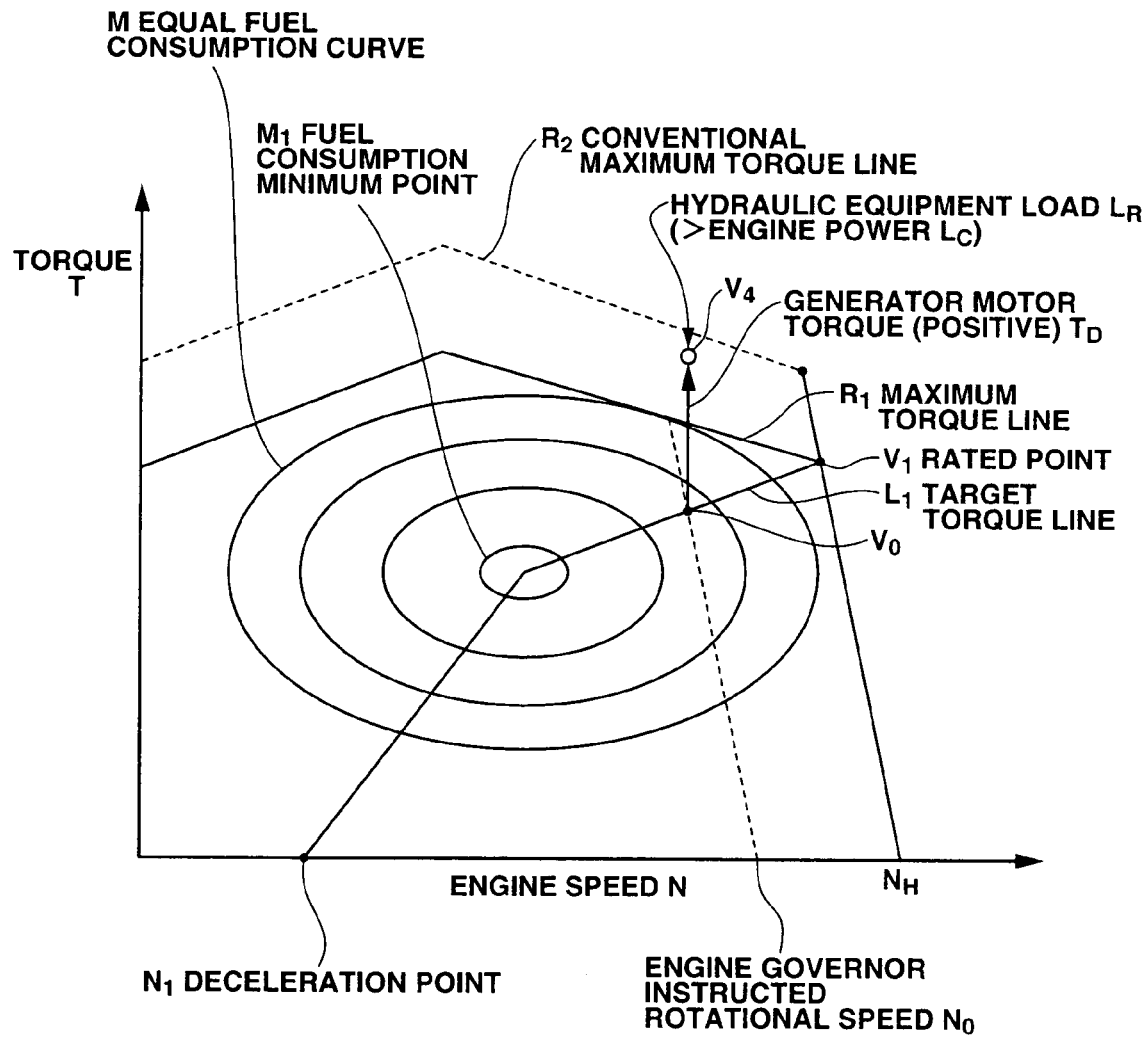
FIG. 9 is a diagram showing an engine torque diagram.

Meanwhile, when the engine 2 is operating at V0 on the target torque line L1 as shown in FIG. 9, if a large hydraulic equipment load LR is produced while operating and the hydraulic equipment load LR exceeds the real engine power Lc, the controller 7 controls the generator motor 4 to generate the power EM corresponding to the difference LR−Lc by the generator motor 4 from the expression (11) or (21) (generator motor power EM=hydraulic equipment load LR−engine power Lc) and to assist the engine power Lc.

Specific control will be described with reference to steps 107, 108, 109 and 110 of FIG. 3.

The detected value Nc by the rotation speed sensor 15 is input to the controller 7, the real engine power Lc corresponding to the engine real rotational speed Nc is determined from the engine power line G (step 107).

Then, the real engine power Lc calculated in the step 107 and the hydraulic equipment load LR calculated in the step 101 are substituted in the expression (11) or (21) (generator motor power EM=hydraulic equipment load LR−engine power Lc) to calculate the generator motor power EM (step 108).

The relation between the real rotational speed Nc (engine real rotational speed Nc) of the generator motor 4 and the torque TD (generated torque (positive), absorption torque (negative)) of the generator motor 4 is stored in the memory as a prescribed curve U of each generator motor for each magnitude of the generator motor power EM and the polarity (positive, negative).

Therefore, the power prescribed curve according to the polarity (positive, negative) and the EM magnitude of the calculated generator motor power EM is selected from the individual generator motor power prescribed curves U. And, the detected value Nc of the rotation speed sensor 15 is taken, torque TD corresponding to the generator motor real rotational speed Nc is determined from the selected power prescribed curve. For example, as indicated by 109 in a broken line of FIG. 3, when the hydraulic equipment load LR is larger than the real engine power Lc and the EM polarity is positive, the power prescribed curve U1 corresponding to EM of the magnitude corresponding to the difference LR−Lc is selected, and the positive torque value TD (generated torque) corresponding to the generator motor real rotational speed Nc is determined on the selected power prescribed curve U1 (step 109).

Then, the torque command value TD determined in the step 109 is output from the controller 7 to the inverter 8. Specifically, when the hydraulic equipment load LR is not more than the real engine power Lc, a negative torque command value TD, which is used to cause the generator motor 4 to absorb the power corresponding to the difference Lc−LR, is given to the inverter 8. As a result, the generator motor 4 generates electric power, absorbs the torque TD and absorbs the power EM corresponding to the difference Lc−LR.

When the hydraulic equipment load LR exceeds the real engine power Lc, a positive torque command value TD, which is used to produce the power corresponding to the difference LR–Lc by the generator motor 4, is given to the inverter 8. As a result, the generator motor 4 operates to perform an electric operation, produces the torque TD and generates the power EM corresponding to the difference LR–Lc. The present engine power Lc is added to the power EM generated by the generator motor 4 to assist the engine power. When the power of the engine 2 is assisted by the generator motor 4, the horsepower and the load generated by the engine 2 and the generator motor 4 match at the matching point V4 as shown in FIG. 9, and horsepower equal to or more than that of the conventional engine is generated and can deal with the load which is increased sharply.

Thus, according to the twelfth control, the fuel consumption of the engine 2 is reduced, the engine efficiency is improved, and the generation of large hydraulic equipment load LR when working can be dealt with properly.

It was described that, when the engine 2 operates on the target torque line L1 (first control), the engine power is assisted by the power of the generator motor 4. But, the twelfth control can be performed in combination with any of the second control, the third control, the fourth control, the fifth control, the sixth control, the seventh control and the eighth control described above. Specifically, when the engine 2 operates on the target torque line set in the areas A1, A2, A3 shown in FIG. 5, FIG. 6 and FIG. 7, the engine power may be assisted by the power of the generator motor 4, and when the engine 2 operates on the target torque line L4 shown in FIG. 8, the engine power may be assisted by the power of the generator motor 4. When the matching point moves toward the high load side on the target torque line L11 shown in FIG. 17, the engine power may be assisted by the power of the generator motor 4. And, when the matching point moves toward the high load side on the target torque line L12 shown in FIG. 18, the engine power may be assisted by the power of the generator motor 4.

Thirteenth Control

Then, an embodiment that fuel consumption in a case of a sharp increase of load (time of hard acceleration) can be reduced will be described.

Specifically, the hydraulic equipment load LR and the turning load Le are calculated in the same manner as the tenth control described above as shown in FIG. 3 (step 101), the engine power LD corresponding to the actuator side required power LR+Le is determined, and the target rotational speed ND of the engine 2 corresponding to the engine power LD is determined from the engine power line G (step 104).

Figure 3:
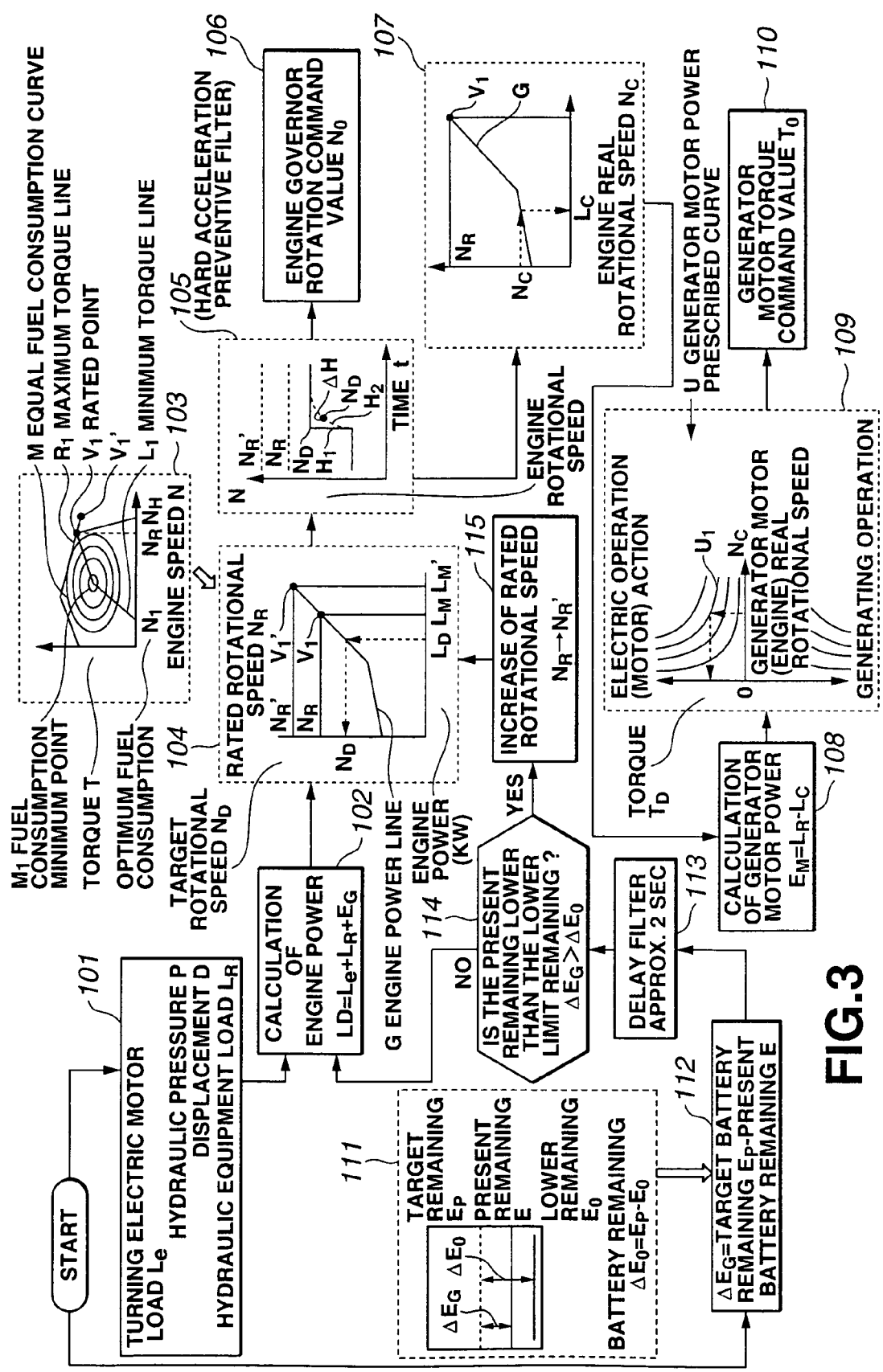
FIG. 3 is a diagram showing the contents of control performed by the controller shown in FIG. 1.

Therefore, when the hydraulic equipment load LR is increasing sharply, a rotation command value ND, which sharply accelerates the engine speed N to the target rotational speed ND, is output to the governor 3 as indicated by H1 in the area of 105 of FIG. 3, but hard acceleration preventive control for delaying the supply of fuel into the cylinders of the engine 2 is performed considering a turbo lag. Specifically, a rotation command value N0 for gradually increasing the rotational speed N of the engine 2 to the engine target rotational speed ND as indicated by the broken line H2 is generated by a hard acceleration preventive filter. For example, the rotation command value N0 which delays a time required for reaching the engine target rotational speed ND by, for example, about 0.5 second is generated (step 105). And, the rotation command value N0 is output to the governor 3. As a result, the supply of fuel into the cylinders of the engine 2 is delayed, the rotational speed N of the engine 2 increases gradually to reach the target rotational speed LD, and the engine power LD is produced (step 106).

Thus, the hard acceleration preventive control is performed to delay the supply of fuel into the cylinders of the engine 2 considering the turbo lag, so that the fuel consumption of the engine 2 when the load increases sharply (hard acceleration) is improved.

The hard acceleration preventive filter is used only when accelerating and not used when decelerating. It is used only for hard acceleration but not for mere acceleration. For example, approximately 10% of the engine's maximum torque is determined as a threshold value, and when a torque increment corresponding to a difference between the target rotational speed ND and the present engine speed N exceeds the threshold value, it is judged as the hard acceleration.

When the hard acceleration preventive filter is used to perform the hard acceleration preventive control to gradually increase the rotational speed N of the engine 2 to the engine target rotational speed ND, it occurs that the engine power cannot catch up with the sharply increasing hydraulic equipment load LR during the hard acceleration preventive control underway. In other words, the engine power corresponding to the rotational speed difference ΔH between the engine target rotational speed ND and the rotation command value N0 instructed by the present governor 3 becomes insufficient as shown within the area indicated by 105 of FIG. 3.

Therefore, the controller 7 determines the power difference LR–Lc corresponding to the above-described rotational speed difference ΔH in the same manner as the above described twelfth control and controls the generator motor 4 according to the expression (11) or (21) (generator motor power EM=hydraulic equipment load LR–engine power Lc), so that the power EM corresponding to the power difference LR–Lc is generated by the generator motor 4 to assist the engine power Lc.

Specifically, the real engine power Lc is calculated from the engine power line G (step 107), the real engine power Lc calculated in the step 107 and the hydraulic equipment load LR calculated in the step 101 are substituted into the expression (11) or (21) (generator motor power EM=hydraulic equipment load LR–engine power Lc) to calculate the generator motor power EM (step 108). And, the torque command value TD corresponding to the generator motor power EM calculated in the step 108 is determined (step 109), the torque command value TD determined in the step 109 is output to the inverter 8, and the generator motor 4 performs an electric operation (step 110). As a result, the power EM (=LR–Lc) corresponding to the rotational speed difference ΔH is generated from the generator motor 4 to assist the power of the engine 2.

Thus, according to the thirteenth control, the fuel consumption is decreased as the load increases sharply, and a shortage of the engine power to the load which increases sharply can be compensated.

Fourteenth Control

Then, an embodiment capable of securing the remainder of the battery 10 will be described.

As described in connection with the tenth control, when the engine 2 is controlled to agree the engine power LD with the actuator side required power or the expression (14) or (24) below is established, the engine 2 does not have horsepower sufficient to cause the generator motor 4 to generate electric power, and remaining E (amount of accumulated electric power) of the battery 10 might become insufficient.

> Engine power LD=actuator side required power (turning electric motor load Le+hydraulic equipment load LR)      (14)

> Engine power LD=actuator side required power (hydraulic equipment load LR)      (24)

The control in this embodiment will be described with reference to steps 111, 112, 113, 101, 102, 103, 104, 106 of FIG. 3.

The detected value E of the voltage sensor 16 is taken as the present remaining E of the battery 10 into the controller 7 (step 111), and remaining deviation $\Delta EG$ between the target remaining Ep and the present remaining E of the battery 10 is calculated (step 112).

Figure 23:
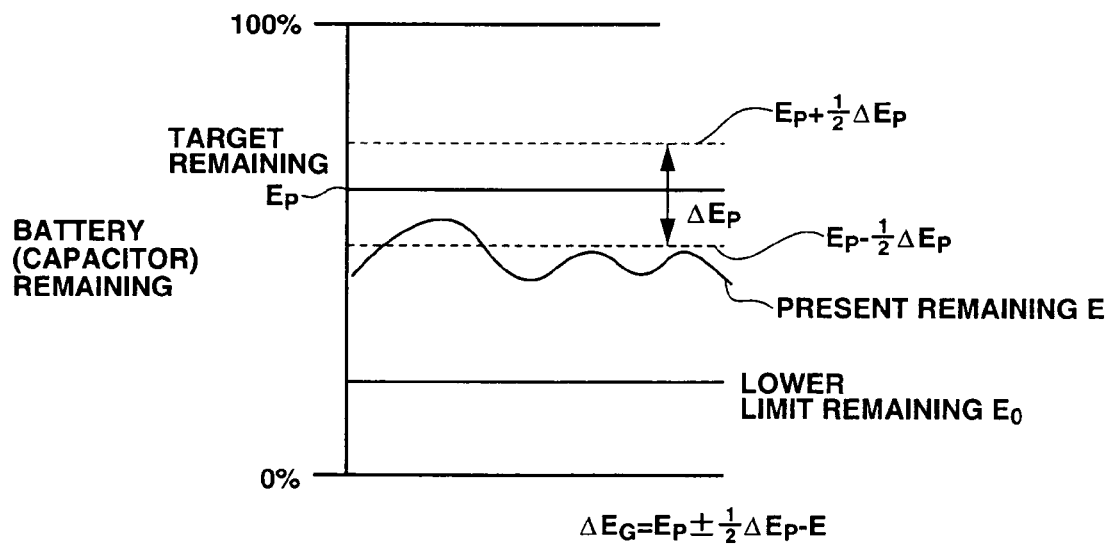
FIG. 23 is a diagram showing a range of a target battery remaining.

Here, the remaining deviation $\Delta EG$ is determined by a delay filter. For example, the average value of the remaining E in the past two seconds is determined, and a deviation between the target remaining Ep and the average value is determined as the remaining deviation $\Delta EG$. This is to obtain a stable value by absorbing changes by the delay filter because the battery remaining E changes largely in a short time. And, a dead zone of prescribed width $\Delta E$ ($\pm\frac{1}{2} \Delta Ep$ of Ep) may be disposed in the target remaining Ep as shown in FIG. 23. When the present remaining E falls in the target remaining range Ep$\pm\frac{1}{2} \Delta Ep$, the remaining deviation $\Delta EG$ is assumed to be zero (step 114).

Then, the expression (14) is modified to the expression (14)' as shown below so that the engine power LD becomes a value which is obtained by adding the power $\Delta EG$, which corresponds to the remaining deviation, to the actuator side required power (Le+LR in the expression (14)).

> Engine power LD=turning electric motor load Le+hydraulic equipment load LR+battery remaining deviation $\Delta EG$      (14)'

The hydraulic equipment load LR and the turning generator motor power Le calculated in the step 101 and power $\Delta EG$ corresponding to the remaining deviation obtained in the step 112 are substituted into the expression (14)' to determine the engine power LD (step 102).

In the same manner as the tenth control, the controller 7 outputs the rotation command value N0 to the governor 3 to control the engine 2 so that the engine power LD determined in the step 102 can be obtained (steps 103, 104, 106).

When the upper rotating body W2 is to be operated by the hydraulic actuator, the engine power LD is determined by using the expression (24)' below which is obtained by modifying the expression (24) so that the engine power LD becomes a value which is obtained by adding the power $\Delta EG$ corresponding to the remaining deviation to the actuator side required power (LR of the expression (24)), > Engine power LD=hydraulic equipment load LR+battery remaining deviation $\Delta EG$      (24)' and the engine 2 may be controlled to obtain the engine power Ld.

As a result, the engine power having an allowance corresponding to the remaining deviation $\Delta EG$ of the battery 10 against the load is generated. The power corresponding to the remaining deviation $\Delta EG$ is absorbed by the generator motor 4, and the power corresponding to the remaining deviation 66 EG is accumulated in the battery 10 via the inverter 8. Therefore, the remaining of the battery 10 is always kept in the vicinity of the target remaining Ep or in the target remaining range Ep$\pm\frac{1}{2} \Delta Ep$ of FIG. 23.

Therefore, when the hydraulic equipment load LR and the turning load Le increase to exceed the real engine power Lc, electric power is surely supplied from the battery 10 to the generator motor 4, the generator motor 4 performs an electric operation, and it is assured that the power of the engine 2 is assisted by the power EM of the generator motor 4.

Thus, according to the fourteenth control, the remaining of the battery 10 can always be maintained at a prescribed level or more, so that when the load is increased, the engine power can be surely assisted by the generator motor 4.

And, the fourteenth control can be performed in appropriate combination with the eleventh control, the twelfth control and the thirteenth control described above.

The actuator side required power is calculated in the above description, but an embodiment can be conducted without calculating the actuator side required power.

In such a case, a torque command for generating the power corresponding to the calculated remaining deviation $\Delta EG$ is given from the controller 7 to the inverter 8. Therefore, the load applied to the engine 2 by the generator motor 4 becomes to correspond to the battery remaining deviation $\Delta EG$. The engine 2 has its power matched with the load on the target torque line L1 in the same manner as in the description made with reference to FIG. 20 by the governor 3. Specifically, the engine power LD matches the load resulting from the addition of the actuator side required power (turning electric motor load Le+hydraulic equipment load LR) and the load (battery remaining deviation $\Delta EG$) of the generator motor 4 and matches on the target torque line L1.

The control will be described specifically with reference to FIG. 22.

Exceeding the Upper Limit Line U

As described above with reference to FIG. 22, when the engine real rotational speed Nnr becomes lower than the upper limit rotational speed Nnm, it is judged that the injection amount $\alpha(Nnd-Nnr)$ has exceeded the maximum injection amount $\alpha(Nnd-Nnm)$ specified by the upper limit line U, and a positive torque command is given to the inverter 8 so to generate torque $\alpha(Nnm-Nnr)$ corresponding to a difference Nnm−Nnr between the upper limit rotational speed Nnm and the real rotational speed Nnr by the generator motor 4. In other words, a positive torque command for generating torque $\alpha((Nnm-Nnr)$ in shortage is given from the controller 7 to the inverter 8 regardless of the value of the battery remaining deviation $\Delta EG$. Therefore, the generator motor 4 performs an electric operation to assist the engine power.

But, when the calculated remaining deviation $\Delta EG$ is negative, the present remaining E is large against the target remaining Ep and the battery 10 has a margin for the amount of accumulated electric power, so that an assist amount of the generator motor 4 may be increased by adding a positive torque command to generate power, which has a remaining deviation $\Delta EG$ portion added to a torque shortage portion $\alpha(Nnm-Nnr)$, to the inverter 8.

Not Exceeding the Upper Limit Line U

When the engine real rotational speed Nnr is not less than the upper limit rotational speed Nnm, it is judged that the injection amount $\alpha(Nnd-Nnr)$ is not more than the maximum injection amount $\alpha(Nnd-Nnm)$ specified by the upper limit line U, and a torque command to generate a positive or negative power equivalent to the calculated remaining deviation ΔEG is given to the inverter 8. Therefore, when the calculated remaining deviation ΔEG is positive, a negative torque command to absorb the torque equivalent to the calculated remaining deviation ΔEG is given to the inverter 8, the torque equivalent to the calculated remaining deviation ΔEG is absorbed by the generator motor 4, and the generator motor 4 generates electric power.

And, when the calculated remaining deviation ΔEG is negative, a positive torque command to generate torque equivalent to the calculated remaining deviation ΔEG is given to the inverter 8, the generator motor 4 performs an electric operation, and the generator motor 4 generates torque equivalent to the calculated remaining deviation ΔEG.

Fifteenth Control

Then, an embodiment capable of taking urgent measures when the remaining of the battery 10 becomes short of the lower limit will be described.

The engine 2 of this embodiment is a compact engine 2 which operates at a rated point V1 where the engine power is lower than the conventional engine's rated point V2 in the same manner as described in connection with the eleventh control as shown in FIG. 4.

As shown in FIG. 4, the rated point V1 of the engine 2 of this embodiment is located in an area, where the fuel consumption is small (good), on the equal fuel consumption curve M as compared with the conventional engine's rated point V2.

The control in this embodiment will be described with reference to steps 111, 112, 113, 114, 101, 102, 103, 104 and 106 of FIG. 3.

Specifically, a remaining deviation ΔEG between the target remaining Ep and the present remaining E of the battery 10 is calculated in the same manner as the eleventh control (steps 111, 112, 113). Then, it is judged whether the remaining deviation ΔEG is larger than the remaining deviation threshold value ΔE0. In other words, it is judged whether the present remaining E of the battery 10 is lower than the lower limit value E0 (step 114). As a result, where it is judged that the battery remaining E is not less than the lower limit value E0 (judged NO in step 114), the process is moved to step 102, and the control is performed in the same way as the eleventh control. At this time, the engine 2 is controlled with the rated point determined at V1 and the upper limit value of the engine power determined as the first upper limit value LM as shown in FIG. 4 as described in connection with the eleventh control (steps 103, 104, 106). Thus, the engine 2 generally operates at the rated point V1 where the engine power is smaller than the conventional engine (rated point V2) but the fuel consumption is good.

But, when the engine 2 keeps operating at the rated point V1 where the engine power tends to be insufficient, the accumulation of electric power into the battery 10 tends to be insufficient, the battery remaining E falls short of the lower limit value E0, and the electric power might not be supplied from the battery 10 to the generator motor 4.

Therefore, when the battery remaining E is judged to be lower than the lower limit value E0 (judged YES in step 114), the target torque line L1 is modified, and the engine power line G is also rewritten in such a way that the upper limit value of the power of the engine 2 becomes the second upper limit value LM' larger than the first upper limit value LM. Specifically, as shown in FIG. 4, the rated rotational speed NR is raised to a higher rated rotational speed NR', and the rated point V1 is moved to a rated point V1' where a higher engine power LM' is obtained (see FIG. 4, step 115), a line segment connecting the rated point V1', the fuel consumption minimum point M1 and the deceleration point N1 is determined as a new target torque line, and the engine power line corresponding to this target torque line is newly determined (steps 103, 104).

Thus, the engine 2 operates at the rated point V1' where the fuel consumption becomes worse but the high engine power LM' can be obtained (step 106). As a result, the engine power of the increased portion is absorbed by the generator motor 4, and the electric power generated by the generator motor 4 is accumulated in the battery 10 via the inverter 8.

Thus, according to the fifteenth control, the engine 2 is generally operated at the rated point V1 where the fuel consumption is good, but if the remaining of the battery 10 becomes lower than the lower limit, the rated point V1 is moved to the rated point V1' to take emergency measures so to enhance the engine power though the fuel consumption becomes worse, thereby enabling to accumulate the electric power in the battery 10. Thus, a situation that electric power to be supplied from the battery 10 to the generator motor 4 becomes insufficient can be avoided.

This fifteenth control can be performed in appropriate combination with the twelfth control and the thirteenth control.

The control to raise the upper limit value of the power of the engine 2 in the short term may be performed manually. Specifically, when the operator feels during execution of work that the engine power is insufficient, he or she turns on the switch 42 disposed on the knob of the operation lever 41*a*. When an on signal ON indicating that the switch 42 is turned on is input to the controller 7, the controller 7 performs processing to modify the target torque line and the engine power line in the same way as described above (steps 115, 103, 104 of FIG. 3). The power's upper limit value of the engine 2 is shifted from LM to LM', and the engine 2 operates at the rated point V1' where higher engine power can be obtained (step 106).

When it is judged that the battery remaining E is lower than the lower limit value E0 (judged YES in step 114), a display command is output from the controller 7 to the monitor panel 50 to notice the fact to the operator or the like, and a warning "the battery 10 remaining is insufficient" is shown on the display screen 50*a* of the monitor panel 50.

Sixteenth Control

According to the fifteenth control described above, the urgent measures are taken to raise the power's upper limit value of the engine 2 in the short term when the battery remaining E is lower than the lower limit value E0, but the power of the actuator of the construction machine 1 may be limited without increasing the power's upper limit value of the engine 2.

Figure 24:
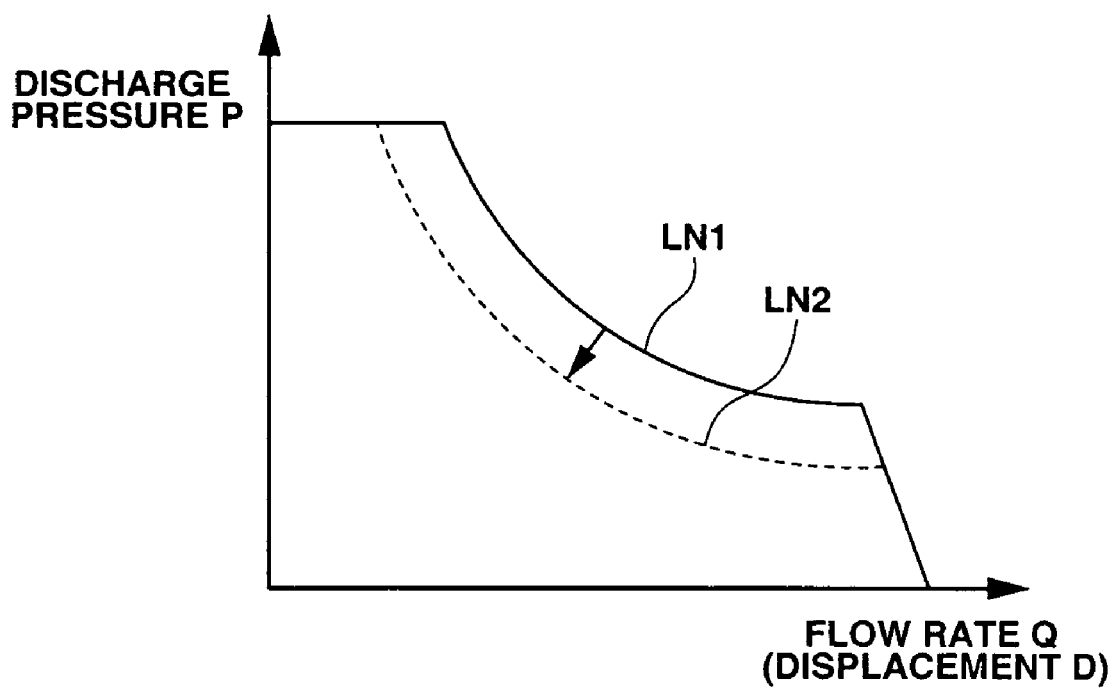
FIG. 24 is a diagram showing a P-Q curve of a hydraulic pump.

For example, when it is judged that the battery remaining E is lower than the lower limit value E0, it is considered that the maximum inclination angle of the swash plate 6*a* of the hydraulic pump 6 is limited to restrict the pump absorption horsepower. It is also considered that P-Q curve LN1 of the hydraulic pump 6 is set to P-Q curve LN2 to have a lower absorption horsepower so to restrict the pump absorption horsepower as shown in FIG. 24. When it is judged that the battery remaining E is lower than the lower limit value E0, it is considered that the power's upper limit value of the turning electric motor 11 is limited to a low value.

Thus, the hydraulic equipment load LR and the turning load Le become low, and the power of the engine 2 has a margin for causing the generator motor 4 to generate electric power by the lowered portion, and the engine power absorbed by the generator motor 4 can be accumulated as electric power in the battery 10.

Seventeenth Control

Figure 11:
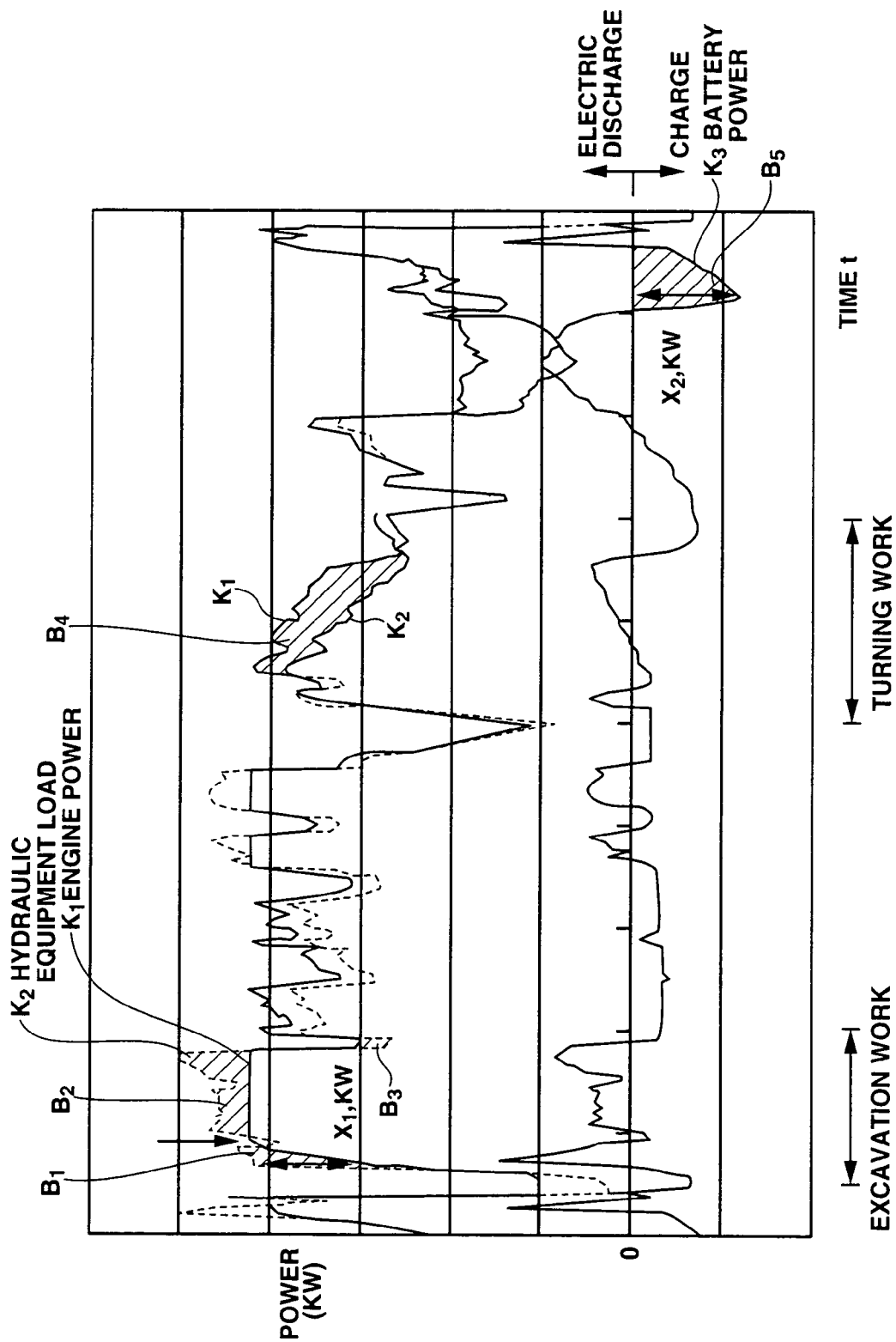
FIG. 11 is a diagram illustrating a result of executing the control of FIG. 3.

FIG. 11 is a graph showing a state of power Lc of the engine 2 of the construction machine 1, hydraulic equipment load (pump absorption horsepower) LR and power CD of the battery (capacitor) 10, the horizontal axis represents time, and the vertical axis represents power (kW). FIG. 11 shows a result of conducting the control shown in FIG. 3.

In FIG. 11, K1 represents the properties of the engine power Lc, K2 represents the properties of the hydraulic equipment load LR, and K3 represent the properties of the battery power CD.

In FIG. 11, B2 shows that the hydraulic equipment load K2 exceeds the engine power K1 when the boom operation lever 41a is manipulated to the maximum operation amount to perform excavation work under heavy load. At this time, the battery 10 discharges, and the generator motor 4 performs an electric operation to assist the engine power, which is not sufficient to the hydraulic equipment load K2, by the power of the generator motor 4.

"B3" shown in FIG. 11 shows that the boom operation lever 41a is moved back to perform a relatively light load work, and the engine power K1 exceeds the hydraulic equipment load K2. At this time, the generator motor 4 is generating electric power, and the electric power corresponding to the remaining deviation ΔEG is supplied to recharge the battery 10. When the engine power K1 far exceeds the hydraulic equipment load K2, a charging amount to the battery 10 becomes large as indicated by B5.

"B4" shown in FIG. 11 shows that the turning operation lever is manipulated to perform turning work, and the engine power K1 exceeds the hydraulic equipment load K2. At this time, the generator motor 4 generates electric power, the electric power is supplied from the generator motor 4 to the turning generator motor 11, and the turning generator motor 11 performs an electric operation.

"B1" of FIG. 11 shows that, when the excavation work is started, the operation lever 41a is moved from the neutral position to increase the hydraulic equipment load K2, but the engine power K1 rises behind the hydraulic equipment load K2. It is because, when the hydraulic equipment load LR is calculated (step 101), the engine power LD corresponding to the hydraulic equipment load LR is determined (step 102), the target rotational speed ND corresponding to the engine power LD is determined (step 104), the governor 3 operates to obtain the target rotational speed ND (steps 105, 106) as shown in FIG. 3, and the power of the engine 2 actually increases to the calculated engine power LD. Because there is a time lag, when the power of the engine 2 has actually increased, the real hydraulic equipment load has increased to the calculated hydraulic equipment load LR or more.

A difference between the hydraulic equipment load K2 and the engine power K1 when the operation lever is applied is compensated by the power EM of the generator motor 4 as indicated by the expression (11) (generator motor power EM=hydraulic equipment load LR−real engine power Lc). Therefore, the battery 10 discharges, the generator motor 4 performs an electric operation to generate the generator motor power EM, and the difference between the real hydraulic equipment load K2 and the real engine power K1 indicated by B1 in FIG. 11 is assisted by the generator motor power EM.

Therefore, it is necessary to design the generator motor 4 so to be capable of obtaining the maximum power corresponding to the difference between the hydraulic equipment load K2 and the engine power K1 when the operation lever is manipulated.

Accordingly, if the difference between the hydraulic equipment load K2 and the engine power K1 when the operation lever is manipulated could be lowered, the maximum power of the generator motor 4 can be made small, and the generator motor 4 can be made compact accordingly.

An embodiment capable of downsizing the generator motor 4 will be described below.

Figure 12:
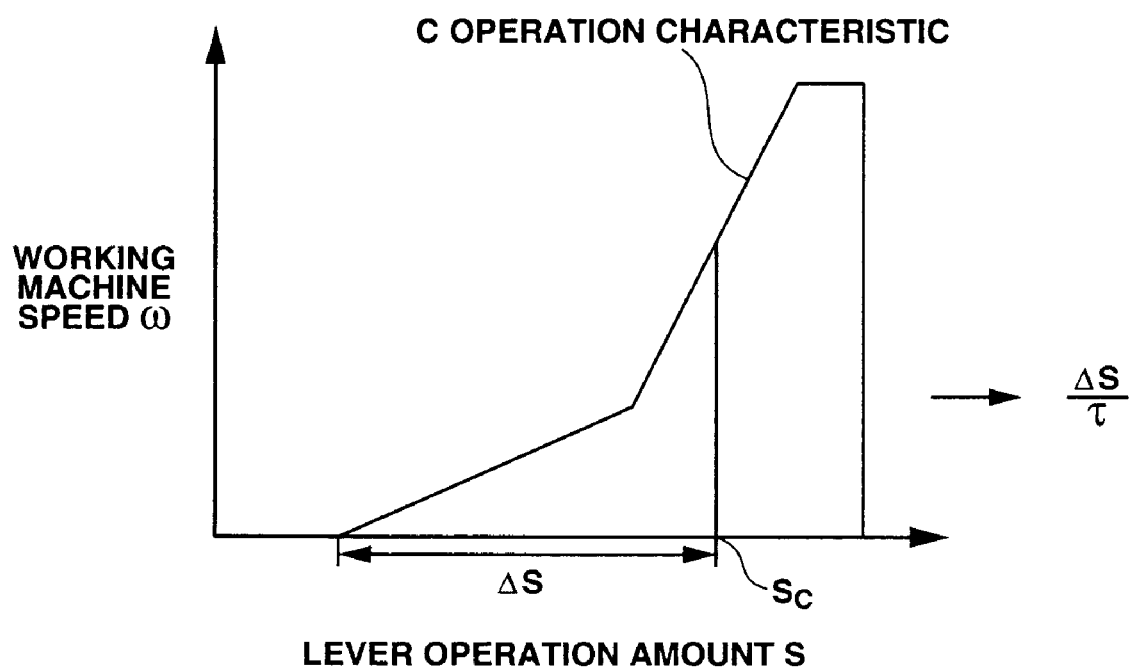
FIG. 12 is a diagram showing the operation characteristics of an operation lever.

FIG. 12 shows the operation characteristic C of the operation lever 41a, the horizontal axis represents a lever operation amount S, and the vertical axis represents the speed of a working machine (boom). The same is also applied to the arm and the bucket other than the boom.

When the operation lever 41a is moved from the neutral position, the swash plate 6a of the hydraulic pump 6 rises from the minimum inclination angle (the displacement D increases), and the pump absorption horsepower increases. The operator predicts the raised portion of the hydraulic equipment load and manipulates the operation lever 41a at a speed according to the increase of load. Therefore, the increment of the hydraulic equipment load LR can be predicted from the speed of manipulating the operation lever 41a.

The controller 7 takes a signal indicating the operation amount S of the operation lever 41a from the operation sensor 41b, measures time τ to reach from the neutral position to the threshold value Sc and calculates the lever operation amount ΔS/τ per unit time as shown in FIG. 12.

Then, a rotational speed increment ΔN (load increment predicted value) to be added to the rotation command value N0 is calculated from the lever operation amount Δs/τ per unit time.

When the hydraulic equipment load LR is calculated in the step 101 of FIG. 3 and the target rotational speed ND is obtained from the hydraulic equipment load LR (step 104), a rotation command value ND+ΔN (N0+ΔN) is produced by adding a rotational speed increment (load increment predicted value) ΔN to the target rotational speed ND (step 105), and the rotation command value ND+ΔN(N0+ΔN) is output to the governor 3.

As a result, the engine power is swiftly increased when the operation lever is applied, and a difference between the hydraulic equipment load K2 and the engine power K1 at the time when the operation lever is applied becomes small. Therefore, the maximum power EM which can be output by the generator motor 4 can be made small, and the generator motor 4 can be made compact accordingly.

The control of this embodiment is desirably performed if the load increases sharply, e.g. when the operation lever is applied. Therefore, a threshold value is determined for the rotational speed increment (load increment predicted value) ΔN, and when the rotational speed increment (load increment predicted value) ΔN exceeds the threshold value (e.g., an increase equivalent to the engine power of 20 kw/sec.), the control of this embodiment is performed.

Instead of the lever operation amount ΔS/τ per unit time, the rotational speed increment ΔN (load increment predicted value) to be added to the rotation command value may be calculated from the lever operation amount ΔS.

Figure 15:
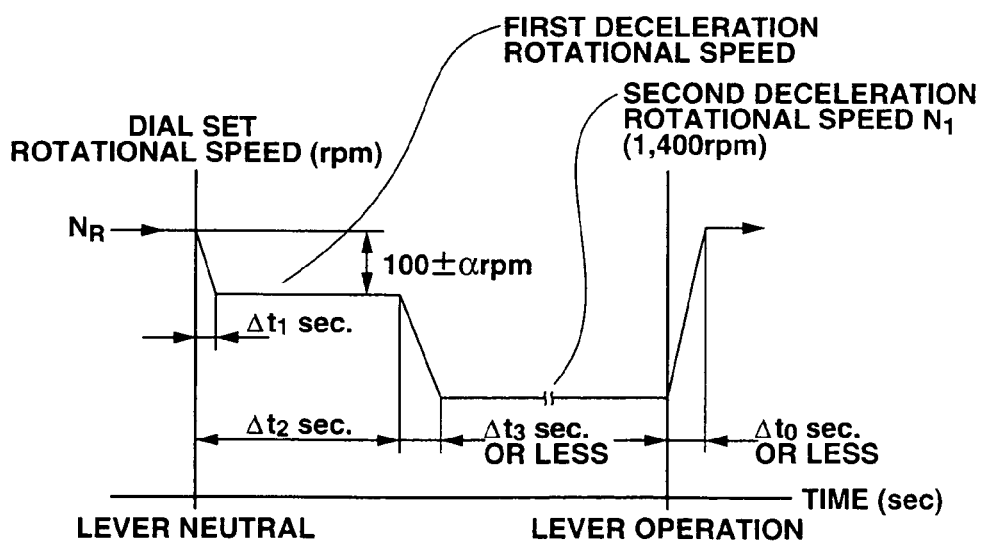
FIG. 15 is a diagram illustrating an auto deceleration.

FIG. 15 is a diagram illustrating the contents of auto deceleration control, the horizontal axis represents a change of the operation lever with time (sec), and the vertical axis represents the engine speed N. The auto deceleration is controlled when the engine speed N is not less than the deceleration rotational speed N1 (1400 rpm). FIG. 15 is based on a case that the rated rotational speed NR is set by the fuel dial 17.

Specifically, when all the operation levers are moved back to the neutral position, the engine speed N drops to a first deceleration rotational speed lower by about 100 rpm than the rated rotational speed NR which is set by the fuel dial 17 in Δt1 second as shown in FIG. 15. Besides, after a lapse of Δt2 second, the engine speed N drops to a second deceleration rotational speed N1 (hereinafter simply called the deceleration rotational speed; 1400 rpm) lower than the first deceleration rotational speed in Δt3 second, and the deceleration rotational speed N1 is maintained until any of the operation levers is manipulated.

When any of the operation levers is moved from the neutral position with the engine speed N kept at the deceleration rotational speed N1, the engine speed N increases to the rated rotational speed NR which is set by the fuel dial 17 in Δt0 (e.g., one second).

The deceleration rotational speed N1 of 1400 rpm is set as a medium rotational speed which is between the low idle rotational speed NL of 1000 rpm and the high idle rotational speed NH of 2200 rpm. It is because the responsivity of the engine 2 is secured when the operation lever is moved from the neutral position. A construction machine to be designed is required for quality assurance that it takes less than prescribed time Δt0 (e.g., one second) to reach from a load-free state to the rated rotational speed NR when the operation lever is moved from the neutral position to apply a hydraulic machine load. When the deceleration rotational speed N1 is set low, the above-described requirement cannot be met, so that the deceleration rotational speed N1 is set to a medium speed higher than the low idle rotational speed NL to secure high responsivity of the engine 2 at the time when the operation lever is started to be manipulated.

But, it is not always appropriate to set the deceleration rotational speed N1 to the medium-speed rotational speed (1400 rpm) in view of the reduction of the fuel consumption.

Figure 16:
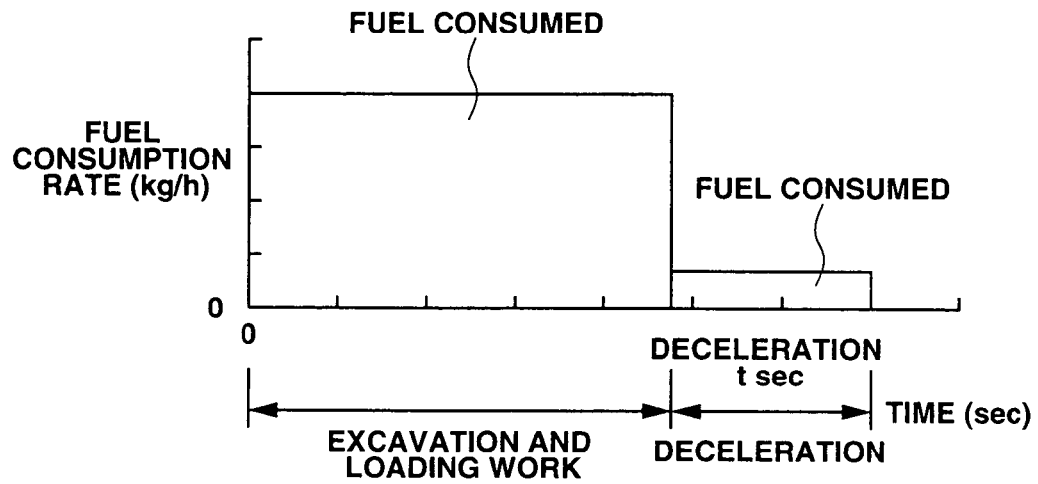
FIG. 16 is a diagram illustrating a fuel consumption rate when a conventional auto deceleration is being made.

FIG. 16 shows an example of data obtained by measuring the fuel consumption when loading and excavating operations were performed by the construction machine for a prescribed cycle time. In FIG. 16, the horizontal axis represents time (sec) and the vertical axis represents the fuel consumption (kg/h) per unit time.

As shown in FIG. 16, fuel consumed by the excavating and loading working machine is represented by area FL1 which is obtained by integrating the time of the horizontal axis and the fuel consumption rate of the vertical axis. The fuel consumption at the deceleration, namely when all the operation levers are moved back to the neutral position and the deceleration rotational speed N1 is kept, is also represented by area FL2 obtained by similarly integrating. The total fuel consumption while operating is a total of FL1 and FL2. A ratio FL2/(FL1+FL2) of the fuel consumed FL2 at the time of deceleration in the total fuel consumed FL1+FL2 reaches 5 to 10% because the hydraulic pump has drag torque. The above description was made on the fuel consumption, but the same is also applied to noise.

Description will be made on an embodiment capable of increasing the engine speed to a target rotational speed (rated rotational speed NR) in a short time (e.g., one second) when the operation lever is moved from the neutral position while reducing the fuel consumption and noise to a level lower than the prior art when the operation lever is moved back to the neutral position.

Eighteenth Control

First, the operator operates either the selection switch 51 or 52 on the monitor panel 50 shown in FIG. 2 to select either a "fuel consumption priority mode" or a "responsivity priority mode". The selection switch 51 is a selection switch for setting a deceleration rotational speed N1' to a rotational speed (e.g., 700 rpm) lower than the low idle rotational speed NL, and the selection switch 52 is a selection switch for setting the deceleration rotational speed N1' to a rotational speed higher than the rotational speed selected by the selection switch 51.

When either the selection switch 51 or 52 is selectively operated, a signal indicating the selected content is input to the controller 7.

Meanwhile, an operation signal is taken form the individual operation sensors containing the operation sensor 41b of the boom operation lever 41a into the controller 7.

According to the operation signal, the controller 7 judges whether all the operation levers have been moved back to the neutral position. As a result, when it is judged that all the operation levers have been moved back to the neutral position, a rotation command value is output to the governor 3 in the same way as in FIG. 15 so to lower the engine speed N to the deceleration rotational speed N1' (e.g., 700 rpm) selected by the selection switches 51, 52 and the deceleration rotational speed N1' is kept until any of the operation levers is manipulated. Therefore, the fuel consumption with the operation lever at the neutral position is improved to be better than the prior art.

When it is judged that any of the operation levers is moved from the neutral position with the engine speed N kept at the deceleration rotational speed N1', the controller 7 outputs a rotation command value to the governor 3 to raise the engine rotational speed N to the engine speed ND (the rated rotational speed NR set by the fuel dial 17) according to the present load and outputs the positive (+) polarity torque command value TD to the inverter 8 to operate the generator motor 4 as an electric motor.

Therefore, when the matching point moves from the no load deceleration point N1' to the high-load rated point V1, the power of the generator motor 4 is added to the power of the engine 2. The matching point moves to the rated point V1 with good responsivity in a short time (e.g., about one second) in the same manner as the prior art because the engine power is assisted by the power of the generator motor 4

Effects of the embodiment will be described with reference to FIGS. 13A and 13B.

Figure 13A:
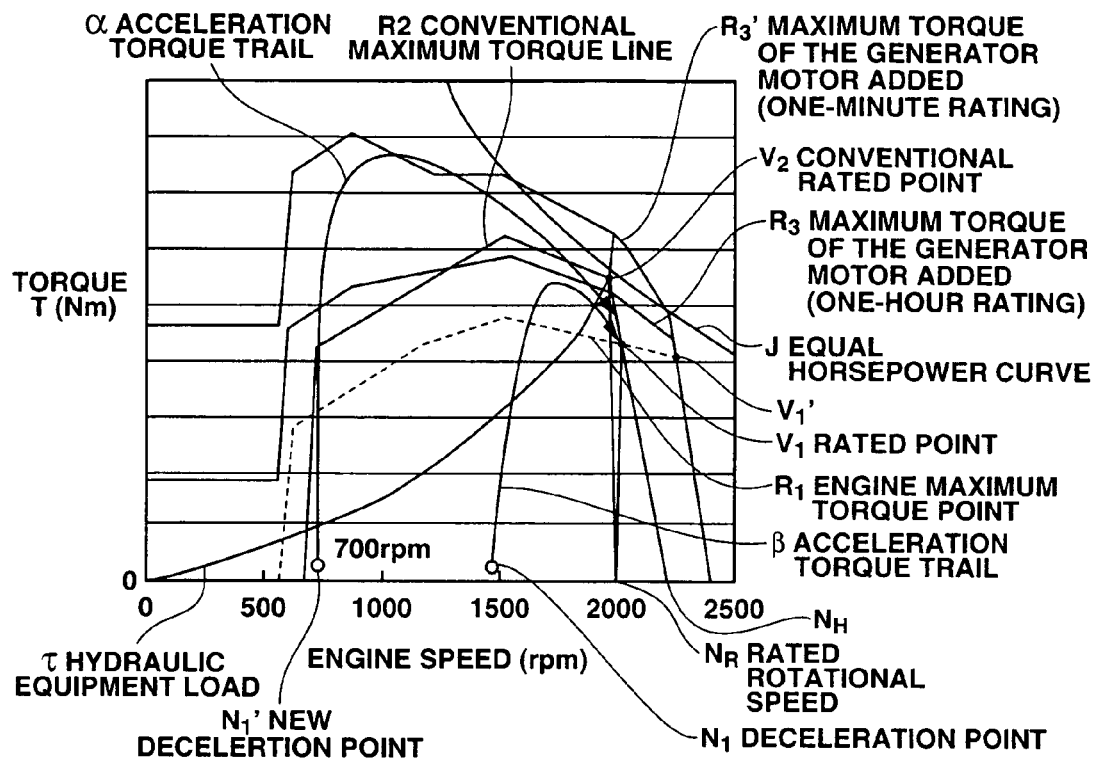
FIG. 13A and FIG. 13B are diagrams showing torque diagrams which illustrate the states of an engine being accelerated.

FIG. 13A shows a comparison of the maximum torque line R2 of the conventional engine and the maximum torque lines R3 (one hour rating), R3' (one minute rating) of this embodiment having the maximum torque line of the generator motor 4 added to the maximum torque line R1 of the engine 2.

Figure 13B:
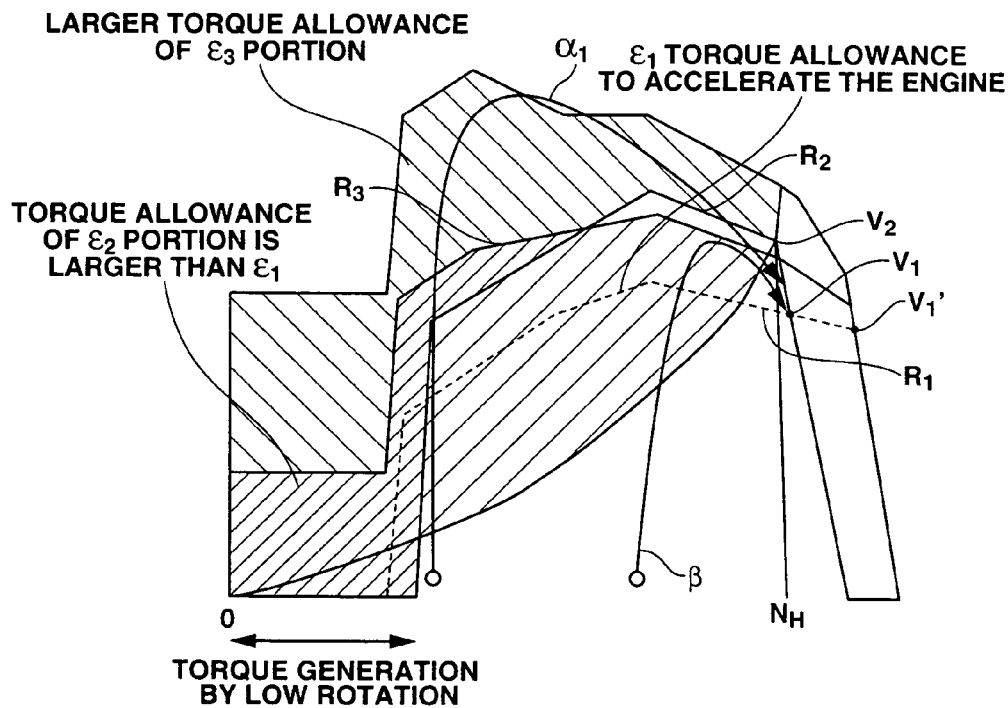

Time to accelerate the engine when the operation lever is manipulated is specified by a hatched area resulting from subtraction of the hydraulic equipment load γ from the maximum torque line as shown in FIG. 13B. The larger an area resulting from the subtraction of the hydraulic equipment load γ from the maximum torque line, the higher an allowance of torque to accelerate the engine. And, the target rotational speed NR can be obtained in a shorter time.

Conventionally, an area resulting from the subtraction of the hydraulic equipment load γ from the maximum torque line R2 is ε1, while the area resulting form the subtraction of the hydraulic equipment load γ from the maximum torque line R3' (one minute rating) according to this embodiment is an area having ∈3 added to ∈1. And, an allowance of torque to accelerate the engine 2 is larger than that of the conventional engine. Similarly, the area resulting from the subtraction of the hydraulic equipment load γ from the maximum torque line R3 (one hour rating) according to this embodiment is an area having ∈2 added to ∈1, and an allowance of torque to accelerate the engine 2 is larger than that of the conventional engine.

Besides, the generator motor 4 generates torque larger at a low rotational speed as compared with the engine 2, so that a large allowance of torque is generated when the engine is started to run.

Therefore, even when the deceleration rotational speed N1' is set to be lower than the conventional deceleration rotational speed N1 (1400 rpm) and to a very low rotational speed N1' (e.g., 700 rpm) lower than the idle rotational speed NL, the engine speed N increases swiftly as indicated by an acceleration torque track α and reaches the rated point V1 in the same short time (e.g., one second or below) as the prior art when the operation lever 41a is moved from the neutral position in this embodiment.

Thus, according to this embodiment, the deceleration rotational speed with the operation lever at the neutral position is set to the very low rotational speed N1' (e.g., 700 rpm) and the acceleration of the engine 2 when the operation lever is manipulated is configured to be assisted by the torque generated by the generator motor 4. Therefore, the fuel consumption and noise when the operation lever is moved back to the neutral position can be made lower than the prior art, and when the operation lever is moved from the neutral position, the engine 2 can be increased it speed to reach the target rotational speed (rated rotational speed NR) in a short time (e.g., one second).

But, when a low deceleration rotational speed N1' is set by the selection switch 51, the fuel consumption can be improved, but the responsivity of the engine 2 is relatively degraded. When a high deceleration rotational speed N1' is set by the selection switch 52, the responsivity of the engine 2 is improved, but the fuel consumption is relatively degraded.

The deceleration rotational speed N1' is changed in two levels by the selection switches 51, 52, but it may be configured to change the deceleration rotational speed N1' seamlessly by a dial or the like.

There may be a case where it is not desirable to set the deceleration rotational speed N1' to a low level depending on conditions such as weather, engine warm-up, and the like. Therefore, the deceleration rotational speed N1' may be set to a higher level depending on conditions.

For example, when a coolant temperature of the engine 2 is detected and not higher than a prescribed value (e.g., 70° C.), the deceleration rotational speed N1' is set to a high rotational speed. And, when the remaining of the battery 10 is detected and not higher than a specified value (e.g., SOC 20%), the deceleration rotational speed N1' is set to a high rotational speed. When atmospheric pressure is detected and not higher than a specified value (e.g., 700 mmHg), the deceleration rotational speed N1' is set a high rotational speed. And, when a temperature of air taken into the engine 2 is detected and not lower than a specified value (e.g., 45° C.), the deceleration rotational speed N1' is set to a high rotational speed.

Nineteenth Control

According to the eighteenth control described above, the engine 2 is operating when the operation lever is at the neutral position but the engine 2 may be stopped.

In such a case, the operator selectively operates the selection switch 53 on the monitor panel 50 shown in FIG. 2 to select a "stop control mode".

When the selection switch 53 is selectively operated, a signal indicating that the stop control shall be performed is input to the controller 7. But, the selective operation of the selection switch 53 is desirably effective for only one stop control. In other words, it is desired to configure that, when stop control is performed one time, the selective operation of the selection switch 54 must be made again to perform the next stop control. Here, the "stop control" is a series of control under which the engine 2 is stopped when all the operation levers are moved back to the neutral position and, when any of the operation levers is moved from the neutral position, the engine 2 is started to raise to the rotational speed corresponding to a load.

Meanwhile, operation signals are taken from the individual operation sensors including the operation sensor 41b of the boom operation lever 41a into the controller 7.

According to the operation signals, the controller 7 judges whether all the operation levers are moved back to the neutral position. As a result, when it is judged that all the operation levers have been back to the neutral position, the controller 7 outputs a command to the governor 3 to stop the engine 2, namely to stop the supply of fuel, and keeps the engine stopped until any of the operation levers is manipulated. Therefore, the fuel consumption with the operation levers in the neutral position is remarkably improved better than the prior art.

When it is judged that any of the operation levers is moved from the neutral position with the engine 2 stopped, the controller 7 outputs a rotation command value to the governor 31 to raise the engine speed N to the engine speed ND (rated rotational speed NR set by the fuel dial 17) according to the present load and outputs a positive (+) polarity torque command value TD to the inverter 8 to cause the generator motor 4 to operate as the electric motor.

Therefore, the engine 2 starts to run as the generator motor 4 runs, and the engine power is assisted by the power generated by the generator motor 4 to move to the rated point V1 with good responsivity in the same short time (e.g., about one second) as the prior art.

Here, the generator motor 4 generates large torque when the generator motor 4 is started (the engine 2 is started) as compared with the engine 2, so that a large torque allowance is produced when the engine is started to run as shown in FIG. 13B.

Therefore, even if the engine 2 is stopped, it is secured that the movement of the operation lever 41a from the neutral position makes the engine speed N increase quickly to reach the rated point V1 in the same short time (e.g., one second or less) as the prior art.

Thus, according to this embodiment, the engine 2 is stopped when the operation levers are in the neutral position, the engine 2 is started by the generator motor 4 when the operation lever is manipulated, and the acceleration of the engine 2 is assisted by the torque generated by the generator motor 4. Therefore, the fuel consumption and noise are reduced to a lower level than the prior art when the operation lever is moved back to the neutral position, and the engine 2 can be increased to the target rotational speed (rated rotational speed NR) in a short time (e.g., one second) when the operation lever is moved from the neutral position.

And, the generator motor 4 also serves as a starter for starting the engine, so that it is not necessary to provide a separate starter, and the components and costs can be reduced. And, the existing starter can be modified to assist the power of the engine 2 so to configure the generator motor 4, so that the system of this embodiment can be configured without substantially modifying the existing apparatus.

When the stop control is performed, the engine 2 stops automatically, and the engine 2 starts automatically, so that it is necessary to attract attention of the operator and people nearby.

Therefore, when the stop control is started, a warning command is output from the controller 7 to the buzzer 19, and the buzzer 19 rings. Thus, the operator and people around the construction machine 1 are called attention, "Stop control on; there is a danger that the working machine moves when the operation lever is manipulated". A loud speaker or the like may be used to produce a melody or voice. Otherwise, a display command is output from the controller 7 to the monitor panel 50 to show "stop control on" on the display screen 50a of the monitor panel 50. Otherwise, the same indication may be shown on a display disposed on the exterior of the construction machine 1. The indication may be made by simply illuminating or blinking a pilot lamp, or characters, a mark or an image may also be lit or blinked.

And, a warning may be sounded or shown from the time when the selection switch 53 is selectively operated to the termination of the stop control. And, a warning may also be sounded or shown only when the engine 2 is stopped and on standby.

There is a case that it is not desirable to stop the engine 2 depending on conditions such as weather, engine warm-up or the like. Therefore, it may be configured not to top the engine 2 depending on conditions.

For example, when a temperature of the engine coolant is not more than the specified value (e.g., 70° C.), the battery remaining is not more than the specified value (e.g., SOC 20%), atmosphere pressure is not more than the specified value (e.g., 700 mmHg) or a temperature of air taken into the engine is not less than the specified value (e.g., 45° C.), the engine is not stopped even if all the operation levers are moved back to the neutral position but the above-described sixteenth control is performed to decrease the engine speed to the deceleration rotational speed N1'.

Twentieth Control

A modified embodiment of the nineteenth control will be described below.

The apparatus of this embodiment is provided with the LS valve 14 as shown in FIG. 2. The LS valve 14 operates in such a way that the differential pressure $\Delta P$ between the discharge pressure P of the hydraulic pump 6 and the load pressure PLS of the hydraulic cylinder 31 becomes a prescribed differential pressure $\Delta PLS$.

When it is assumed that an open area of the spool of the operation valve 21 is A and a resistance coefficient is C, a discharge flow rate Q of the hydraulic pump 6 is represented by the above-described expression (2) ($Q=C \cdot \vec{A} \cdot \sqrt{(\Delta P)}$).

The differential pressure $\Delta P$ is made to be constant by the LS valve 14, so that the pump flow rate Q is changed by only an open area A of the spool of the operation valve 21.

When the operation lever 41a for the working machine is moved from the neutral position, the open area A of the spool of the operation valve 21 increases according to the operation amount, and the pump flow rate Q increases according to the increase of the open area A. At this time, the pump flow rate Q is not affected by a magnitude of the hydraulic equipment load but determined according to only the operation amount of the operation lever 41a for the working machine. Thus, the pump flow rate Q is not increased or decreased by a load because the LS valve 14 is disposed but changed by the operator as he or she wanted (according to the moved position of the operation lever), and fine controllability, namely operability in the middle operation area, is improved.

The relationship presented by the above-described expression (1) ($Q=N \cdot D$) is established among the discharge flow rate Q of the hydraulic pump 6, the rotational speed N of the engine 2 and the displacement D of the hydraulic pump 6.

Here, it is assumed that the inclination angle of the swash plate 6a of the hydraulic pump 6 is not limited, and the maximum dimension can be obtained at the maximum inclination angle.

When the operation lever 41a for the working machine is manipulated, the spool opening area A increases according to the above-described expression (2), and a large flow rate Q is discharged according to the increased opening area A from the hydraulic pump 6. But, when the operation lever 41a for the working machine is started to operate, the engine is in a stopped state, the rotational speed is a very low rotational speed N of substantially zero at the time of starting to run the engine in view of the expression (1) ($Q=N \cdot D$), but the pump displacement D is kept at the maximum level in order to discharge the required large flow rate Q.

When the operation lever is manipulated, acceleration of the engine 2 is assisted by the torque generated by the generator motor 4, but the hydraulic pump 6 is kept at the maximum displacement, so that the pressure oil of large flow rate Q is discharged according to an operation amount of the operation lever 41a. Therefore, the torque of the engine 2 does not have an allowance to be used for the acceleration of the engine 2 and absorbed by the hydraulic pump 6, adversely affecting on the acceleration when the engine is started to run.

Therefore, according to the twentieth control, when the operation lever 41a for the working machine is moved from the neutral position, the displacement of the hydraulic pump 6 is limited to a value smaller than the maximum displacement until a prescribed time comes or the engine speed reaches a prescribed speed. Specifically, the inclination angle of the swash plate 6a of the hydraulic pump 6 is limited to an inclination angle smaller than the maximum inclination angle.

Thus, the flow rate Q required for the hydraulic pump 6 is limited, the torque of the engine 2 is provided with an allowance, and the torque allowance is used for acceleration of the engine 2. And the acceleration of the engine at the time of its start is improved.

As described above, according to the twentieth control, the fine controllability of the operation lever is improved, and the acceleration of the engine when the operation lever is operated with the engine in a stopped state can be improved.

The eighteenth control, the nineteenth control and the twentieth control can be performed in appropriate combination with the first, second, fourth and sixth to seventeenth control. In other words, the deceleration point N1 as shown in FIG. 4 and the like is changed to the deceleration point N1' where the rotational speed is lower, a target torque line passing through the deceleration point, such as the target torque line L1, is set, and a variety of control is performed.

What is claimed is:

1. An engine control device for controlling an engine to move a matching point according to a load applied to the engine on an engine torque diagram having an axis representing engine speed and an axis representing torque, wherein:
   a target torque line is set to pass through a fuel consumption minimum point, where a fuel consumption rate becomes minimum, or to pass through a vicinity of the fuel consumption minimum point and is set to be continuous from a low rotational speed to a high rotational speed on the engine torque diagram, and the engine is controlled to match at a point on the target torque line.

2. An engine control device for controlling an engine to move a matching point according to a load applied to the engine on an engine torque diagram having an axis representing engine speed and an axis representing torque, wherein:
   a target torque line is set to pass through a fuel consumption minimum point, where a fuel consumption rate becomes minimum on individual equal horsepower curves of the engine torque diagram, or to pass through a vicinity of the fuel consumption minimum point and is set to be continuous from a low rotational speed to a high rotational speed, and the engine is controlled to match at a point on the target torque line.

3. The engine control device according to claim 1, wherein the engine is controlled to match at a point on the target torque line including a line segment which connects a torque point at a time of rated output and the fuel consumption minimum point or the vicinity of the fuel consumption minimum point.

4. The engine control device according to claim 1, wherein the engine is controlled to match at a point on the target torque line which connects a torque point at a time of rated output, the fuel consumption minimum point or the vicinity of the fuel consumption minimum point and a deceleration point at a time of auto deceleration or a vicinity of the deceleration point.

5. An engine control device for controlling an engine by a governor to move a matching point according to a load applied to the engine on an engine torque diagram having an axis representing engine speed and an axis representing torque, wherein:
   a target torque line is set to pass through a fuel consumption minimum point, where a fuel consumption rate becomes minimum on the engine torque diagram or to pass through a vicinity of the fuel consumption minimum point and is set to be continuous from a low rotational speed to a high rotational speed;
   individual regulation lines are set to connect individual matching target rotational speeds and individual instructed rotational speeds on the target torque line;
   the governor injects fuel in an amount corresponding to a difference between an instructed rotational speed and a real rotational speed into the engine; and
   a command to change the instructed rotational speed by a portion corresponding to a difference between a matching target rotational speed and the real rotational speed is given to the governor.

6. An engine control device for controlling an engine by a governor to move a matching point according to a load applied to the engine on an engine torque diagram having an axis representing engine speed and an axis representing torque, wherein:
   a target torque line is set to pass through a fuel consumption minimum point, where a fuel consumption rate becomes minimum on individual equal horsepower curves of the engine torque diagram, or to pass through a vicinity of the fuel consumption minimum point; and is set to be continuous from a low rotational speed to a high rotational speed;
   individual regulation lines are set to connect individual matching target rotational speeds and individual instructed rotational speeds on the target torque line;
   the governor injects fuel in an amount corresponding to a difference between an instructed rotational speed and a real rotational speed into the engine; and
   a command to change the instructed rotational speed by a portion corresponding to a difference between a matching target rotational speed and the real rotational speed is given to the governor.

7. The engine control device according to claim 1, wherein:
   an electric motor is coupled to an output shaft of the engine; and
   the electric motor is operated when the matching point moves on the engine torque diagram in a direction that a load applied to the output shaft becomes large.

8. The engine control device according to claim 5, wherein:
   an electric motor is coupled to an output shaft of the engine;
   an upper limit line specifying a maximum injection amount of fuel is set between an engine maximum torque line and the target torque line on the engine torque diagram; and
   the electric motor is operated when an injection amount corresponding to a difference between an instructed rotational speed and a real rotational speed exceeds the maximum injection amount specified by the upper limit line.

9. An engine control device for controlling an engine to move a matching point, where engine power torque matches absorption torque of a hydraulic pump, on an engine torque diagram having an axis representing engine speed and an axis representing torque, wherein:
   a target torque line is set in an area on the engine torque diagram where the engine has a low rotational speed and the hydraulic pump has a large displacement and is set to be continuous from a low rotational speed to a high rotational speed, and the engine is controlled to match at a point on the target torque line.

10. An engine control device for controlling an engine to move a matching point, where engine power torque matches absorption torque of a hydraulic pump, on an engine torque diagram having an axis representing engine speed and an axis representing torque, wherein:
   a second target torque line being continuous from a low rotational speed to a high rotational speed, where the engine has a low rotational speed and the hydraulic pump has a large displacement, is set with respect to a first target torque line which passes through a fuel consumption minimum point, where a fuel consumption rate becomes minimum on individual equal horsepower curves of the engine torque diagram, or passes through a vicinity of the fuel consumption minimum point and is continuous from a low rotational speed to a high rotational speed; and
   the engine is controlled to match at a point on the second target torque line.

11. An engine control device for controlling an engine to move a matching point, where engine power torque matches absorption torque of a hydraulic pump, on an engine torque diagram having an axis representing engine speed and an axis representing torque, wherein:
- a first target torque line is set to pass through a fuel consumption minimum point, where a fuel consumption rate becomes minimum on individual equal horsepower curves of the engine torque diagram, or pass through a vicinity of the fuel consumption minimum point and is set to be continuous from a low rotational speed to a high rotational speed;
- a second target torque line being continuous from a low rotational speed to a high rotational speed, where the engine has a low rotational speed and the hydraulic pump has a large displacement, is set with respect to the first target torque line;
- either the first target torque line or the second target torque line is selected; and
- the engine is controlled to match at a point on the selected target torque line.

12. The engine control device according to claim 9, further comprising means for controlling to have a prescribed differential pressure between a discharge pressure of the hydraulic pump and a load pressure of a hydraulic actuator.

13. The engine control device according to claim 9, wherein:
- an electric motor is coupled to an output shaft of the engine; and
- the electric motor is operated when a matching point moves on the engine torque diagram in a direction that a load applied to the output shaft becomes large.

14. The engine control device according to claim 2, wherein the engine is controlled to match at a point on the target torque line including a line segment which connects a torque point at the time of rated output and the fuel consumption minimum point or the vicinity of the fuel consumption minimum point.

15. The engine control device according to claim 2, wherein the engine is controlled to match at a point on the target torque line which connects a torque point at a time of rated output, the fuel consumption minimum point or the vicinity of the fuel consumption minimum point and a deceleration point at a time of auto deceleration or a vicinity of the deceleration point.

16. The engine control device according to claim 3, wherein the engine is controlled to match at a point on the target torque line which connects the torque point at the time of rated output, the fuel consumption minimum point or the vicinity of the fuel consumption minimum point and a deceleration point at a time of auto deceleration or a vicinity of the deceleration point.

17. The engine control device according to claim 2, wherein:
- an electric motor is coupled to an output shaft of the engine; and
- the electric motor is operated when the matching point moves on the engine torque diagram in a direction that a load applied to the output shaft becomes large.

18. The engine control device according to claim 3, wherein:
- an electric motor is coupled to an output shaft of the engine; and
- the electric motor is operated when the matching point moves on the engine torque diagram in a direction that a load applied to the output shaft becomes large.

19. The engine control device according to claim 4, wherein:
- an electric motor is coupled to an output shaft of the engine; and
- the electric motor is operated when the matching point moves on the engine torque diagram in a direction that a load applied to the output shaft becomes large.

20. The engine control device according to claim 5, wherein:
- an electric motor is coupled to an output shaft of the engine; and
- the electric motor is operated when the matching point moves on the engine torque diagram in a direction that a load applied to the output shaft becomes large.

21. The engine control device according to claim 6, wherein:
- an electric motor is coupled to an output shaft of the engine; and
- the electric motor is operated when the matching point moves on the engine torque diagram in a direction that a load applied to the output shaft becomes large.

22. The engine control device according to claim 6, wherein:
- an electric motor is coupled to an output shaft of the engine;
- an upper limit line specifying a maximum injection amount of fuel is set between an engine maximum torque line and the target torque line on the engine torque diagram; and
- the electric motor is operated when an injection amount corresponding to a difference between an instructed rotational speed and a real rotational speed exceeds the maximum injection amount specified by the upper limit line.

23. The engine control device according to claim 10, further comprising means for controlling to have a prescribed differential pressure between a discharge pressure of the hydraulic pump and a load pressure of a hydraulic actuator.

24. The engine control device according to claim 11, further comprising means for controlling to have a prescribed differential pressure between a discharge pressure of the hydraulic pump and a load pressure of a hydraulic actuator.

25. The engine control device according to claim 10, wherein:
- an electric motor is coupled to an output shaft of the engine; and
- the electric motor is operated when the matching point moves on the engine torque diagram in a direction that a load applied to the output shaft becomes large.

26. The engine control device according to claim 11, wherein:
- an electric motor is coupled to an output shaft of the engine; and
- the electric motor is operated when the matching point moves on the engine torque diagram in a direction that a load applied to the output shaft becomes large.

* * * * *